(12) United States Patent
Inoshita et al.

(10) Patent No.: US 8,257,183 B2
(45) Date of Patent: Sep. 4, 2012

(54) TORQUE FLUCTUATION ABSORBER

(75) Inventors: Yoshitaka Inoshita, Kariya (JP);
Tomohiro Saeki, Anjo (JP); Satoshi Nakagaito, Kariya (JP); Hiroaki Suezaki, Anjo (JP); Toshiyuki Saburi, Nagoya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 233 days.

(21) Appl. No.: 12/748,673

(22) Filed: Mar. 29, 2010

(65) Prior Publication Data
US 2010/0243400 A1 Sep. 30, 2010

(30) Foreign Application Priority Data

Mar. 31, 2009 (JP) ................. 2009-084448

(51) Int. Cl.
*F16D 7/02* (2006.01)
*F16F 15/123* (2006.01)
(52) U.S. Cl. ...................... 464/46; 464/68.41
(58) Field of Classification Search ............. 464/45–48, 464/66.1, 68.1, 68.4, 68.41, 68.9, 68.92; 192/30 V, 55.61, 70.17, 204, 213.11, 213.12, 192/213.21–214.1
See application file for complete search history.

(56) References Cited

U.S. PATENT DOCUMENTS

| 4,485,907 A | * | 12/1984 | Nishimura ................. 464/68.4 |
| 5,762,558 A | * | 6/1998 | Takehira ................... 464/68.1 |
| 6,302,799 B1 | * | 10/2001 | Hashimoto et al. ........ 464/68.41 |
| 7,207,887 B2 | | 4/2007 | Nakagaito et al. |
| 2002/0194949 A1 | * | 12/2002 | Kintou et al. |

FOREIGN PATENT DOCUMENTS
JP 2005-127507 A 5/2005

* cited by examiner

*Primary Examiner* — Gregory Binda
*Assistant Examiner* — Josh Skroupa
(74) *Attorney, Agent, or Firm* — Buchanan Ingersoll & Rooney PC

(57) ABSTRACT

A torque fluctuation absorber includes a first plate member, ring-shaped second and third plate members, a fourth plate member, a resilient member and a predetermined member. The resilient member absorbs torque fluctuation between the second or third plate member and the fourth plate member. The predetermined member on a power transmission path between at least two of the first, second and third plate members has a stopper section. The stopper section allows relative rotation between the second or third plate member and the fourth plate member within a predetermined distance in the circumferential direction of the second plate member. The stopper section prevents relative rotation between the second or third plate member and the fourth plate member by contacting to the fourth plate member.

19 Claims, 23 Drawing Sheets

TORQUE FLUCTUATION ABSORBER

CROSS REFERENCE TO RELATED APPLICATION

This application is based on and claims priority under Paris convention of Japanese Patent Application No. 2009-84448 filed on Mar. 31, 2009, the entire content of which is incorporated herein by reference.

TECHNICAL FIELD

The present disclosure relates to a torque fluctuation absorber that absorbs fluctuating torque between rotating shafts, and more particularly to a torque fluctuation absorber having stopper construction that regulates the relative rotation between a side plate and hub.

BACKGROUND DISCUSSION

A torque fluctuation absorber, for Example, is located in the power transmission path between an engine and a transmission and absorbs (suppresses) fluctuating torque that occurs due to the engine and the transmission. There are torque fluctuation absorbers that comprise a damper unit that absorbs fluctuating torque through spring force, a hysteresis unit that absorbs (suppresses) fluctuating torque through hysteresis torque due to friction or the like, and a limiter unit that causes slipping to occur when torsion of a rotating shaft cannot be absorbed by a damper unit or hysteresis unit. In addition, in order that a coil spring is not crushed due to relative rotation between side plates and hub, the damper unit has stopper construction that allows relative rotation between the side plates and hub within a predetermined range, but prevents relative rotation outside that range.

For Example, in Patent Document 1, a torque fluctuation absorber is disclosed that has a stopper construction between two inner convex sections that are formed around the end section on the inside of a disk to which the side plates are attached by rivets, and that allows relative rotation between the side plates and a hub within the movable range in the circumferential direction of an outer convex section that is formed around the end section on the outside of the flange section of the hub, and prevents relative rotation between the side plates and hub by locking the outer convex section by the inner convex sections.

[Patent Document 1]
  JP-2005-127507A

The disclosure of above Patent Document is incorporated by reference thereto. The following analysis is given by this disclosure.

However, in the conventional torque fluctuation absorber disclosed by JP-2005-127507A, a disk to which friction material is fastened is held between two side plates fastened inside the limiter unit using rivets, so the overall size of the device in the axial direction becomes large, and there was limitation in the space in the axial direction.

Thus, there is much to be desired in the art. In one aspect, there is a need to provide a torque fluctuation absorber having a stopper construction that can improve the effective use of space in the axial direction.

SUMMARY

According to an aspect of this disclosure, a torque fluctuation absorber that includes: a first plate member to which rotation power from a first rotating shaft is transmitted; a second plate member and a third plate member to which rotation power from the first plate member is transmitted; a fourth plate member that is located between the second plate member and the third plate member, and transmits rotation power to a second rotating shaft; and a resilient member(s) that absorbs torque fluctuation between the second and third plate members and the fourth plate member. The first plate member, being located on the opposite side of the fourth plate member from the second plate member, rotates in unison with the second and the third plate members. A predetermined member(s) on the power transmission path between the first and second plate members and the third plate member has a stopper section that allows relative rotation between the second and third plate members and the fourth plate member within a predetermined distance in the circumferential direction, and by locking movement of a predetermined portion of the fourth plate member, prevents relative rotation between the second and third plate members and the fourth plate member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
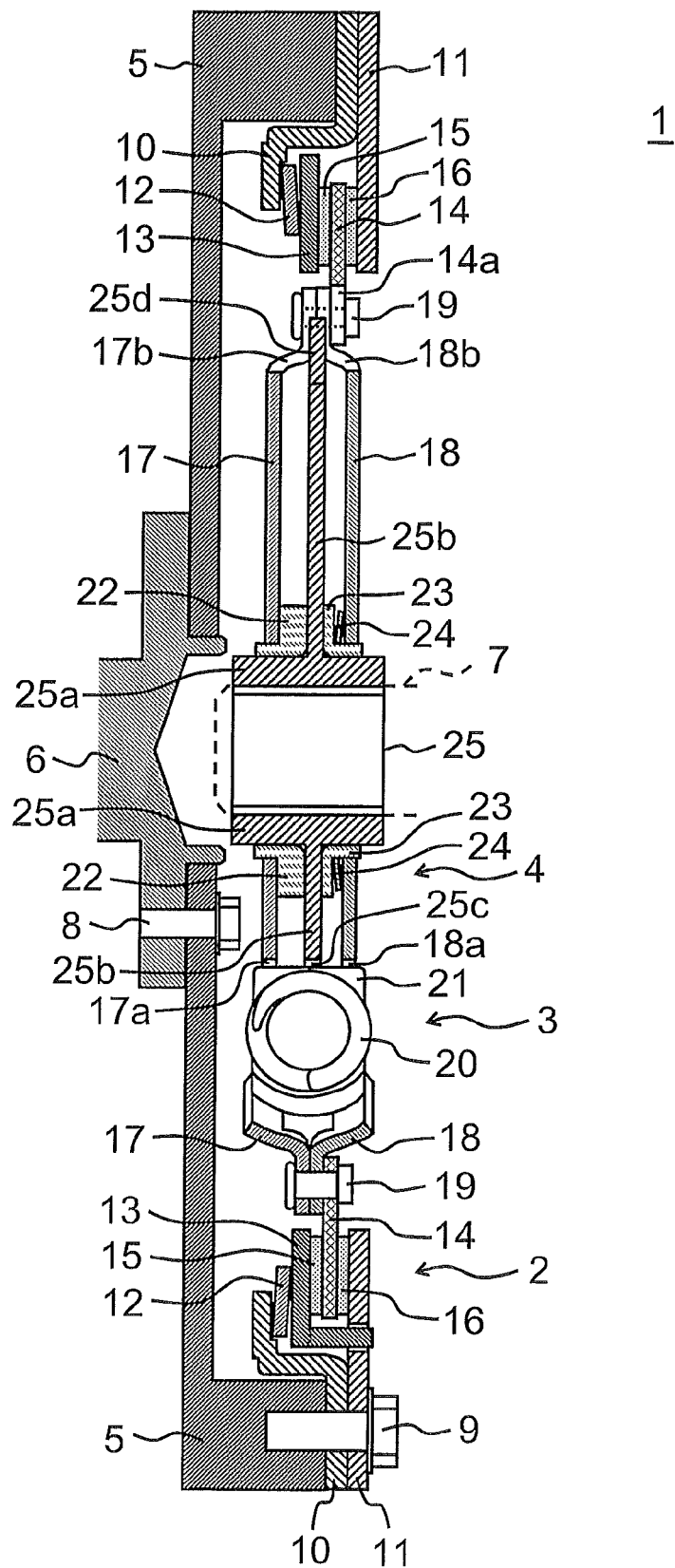
FIG. 1 is a cross-sectional drawing in the radial direction that schematically shows the construction of a torque fluctuation absorber of a first Example disclosed here.

There are various modes possible according to this present disclosure.

Mode 1 corresponds to the first aspect.

Mode 2:

It is preferred that the torque fluctuation absorber comprises a flywheel that, being located on a power transmission path between the first rotating shaft and the first plate member, is fastened to the first rotating shaft; wherein the second plate member is located between the third plate member and the flywheel.

Mode 3:

It is preferred that the torque fluctuation absorber comprise a limiter unit that, being located on a power transmission path between the first rotating shaft and the first plate member, causes slipping to occur when the torque fluctuation reaches a predetermined value; wherein the first plate member is a member on the output side of the limiter unit.

Mode 4:

It is preferred that in the torque fluctuation absorber the stopper section be a component of one of or both of the second plate member and the third plate member.

Mode 5:

It is preferred that in the torque fluctuation absorber one or both of the second plate member and the third plate member have a portion that is processed by bending or drawing in a portion that corresponds to the stopper section.

Mode 6:

It is preferred that in the torque fluctuation absorber one or both of the second plate member and the third plate member have an outward protruding outer convex section in the outer perimeter end section thereof in the portion that corresponds to the stopper section, the first plate member be fastened to the outer convex section by rivets, and the predetermined portion of the fourth plate member be the other outward protruding outer convex section in an outer perimeter section.

Mode 7:

It is preferred that in the torque fluctuation absorber the stopper section be a stopper member that is located between at least the second plate member and the third plate member.

Mode 8:

It is preferred that in the torque fluctuation absorber one end of the stopper member be crimped to fasten the second plate member, and the other end of the stopper member be crimped to fasten the third plate member and the first plate member.

Mode 9:

It is preferred that in the torque fluctuation absorber one end of the stopper member be crimped to fasten the second plate member, and the other end of the stopper member be crimped to fasten the third plate member.

Mode 10:

It is preferred that in the torque fluctuation absorber the stopper member be formed such that a length in the circumferential direction of the second plate member is longer than a length in the direction that orthogonally crosses the axial direction of the second rotating shaft.

Mode 11:

It is preferred that in the torque fluctuation absorber the stopper member be fastened to the second plate member and the third plate member by rivets.

Mode 12:

It is preferred that in the torque fluctuation absorber the stopper member be formed into a plate shape.

Mode 13:

It is preferred that in the torque fluctuation absorber the resilient member is one of a plurality of resilient members, the predetermined portion of the fourth plate member be an outward protruding outer convex section at the outer perimeter end section of a portion located between neighboring two of the resilient members.

Mode 14:

It is preferred that in the torque fluctuation absorber the resilient member is one of a plurality of resilient members, the predetermined portion of the fourth plate member be a concave section or hole section that is formed in a portion that is located between neighboring two of the resilient members.

Mode 15:

It is preferred that in the torque fluctuation absorber the stopper member be located further outside than the most outside portion of the resilient members in the direction perpendicular to the axis of the first rotating shaft.

Mode 16:

It is preferred that in the torque fluctuation absorber the stopper member be located further inside than the most outside portion of the resilient members in a direction perpendicular to the axis of the first rotating shaft.

Mode 17:

It is preferred that in the torque fluctuation absorber the stopper section be a component of the first plate member, and the first plate member be formed such that a portion that corresponds to the stopper section is bent and located on an orbit of the predetermined portion of the fourth plate member.

Mode 18:

It is preferred that in the torque fluctuation absorber a portion of the first plate member different than the portion that corresponds to the stopper section be located at a position that is offset toward the side of the third plate member with respect to the stopper section, and fastened to the second plate member and the third plate member by a rivet.

Mode 19:

It is preferred that in the torque fluctuation absorber the stopper section be a component of the second plate member or the third plate member; and one plate member of the second and third plate members have the stopper section that extends toward the other plate member, with a portion that extends from a tip end section of the stopper section being inserted into a hole or a groove that is formed in the other plate member, and fastens the other plate member to the one plate member.

Mode 20:

It is preferred that in the torque fluctuation absorber fastening the other plate member to the one plate member be performed by forming the portion that extends from the tip end section of the stopper section into a bent section that is bent into one or a plurality of directions.

Mode 21:

It is preferred that in the torque fluctuation absorber fastening the other plate member to the one plate member be performed by crimping the portion that extends from the tip end section of the stopper section.

Mode 22:

It is preferred that in the torque fluctuation absorber the stopper section be a component of the second plate member, and the portion that extends from the tip end section of the stopper section be inserted into a hole or groove that is formed in the third plate member, and into a hole that is formed in the first plate member to fasten the first plate member and the third plate member to the second plate member.

Mode 23:

It is preferred that in the torque fluctuation absorber the stopper section be a component of the second plate member, and the third plate member also function as the first plate member.

Mode 24:

It is preferred that a torque fluctuation absorber comprises: a first plate member to which rotation power for a first rotating shaft is transmitted; a second plate member and a third plate member which are substantially annular and to which rotation power from the first plate member is transmitted; a fourth plate member that is disposed between the second or third plate member and the fourth plate member and that transmits rotation power to a second rotating shaft; and a resilient member that absorbs torque fluctuation between the second or third plate member and the fourth plate member; wherein the first plate member, being located on the opposite side of the fourth plate member from the second plate member, rotates in unison with the second and third plate members; a predetermined member on the power transmission path between at least two of among the first, second and third plate members has a stopper section that allows relative rotation between the second or third plate member and the fourth plate member in the circumferential direction of the second plate member, and prevent relative rotation between the second or third plate member and the fourth plate member by contacting to the fourth plate member.

First Embodiment

Figure 2:
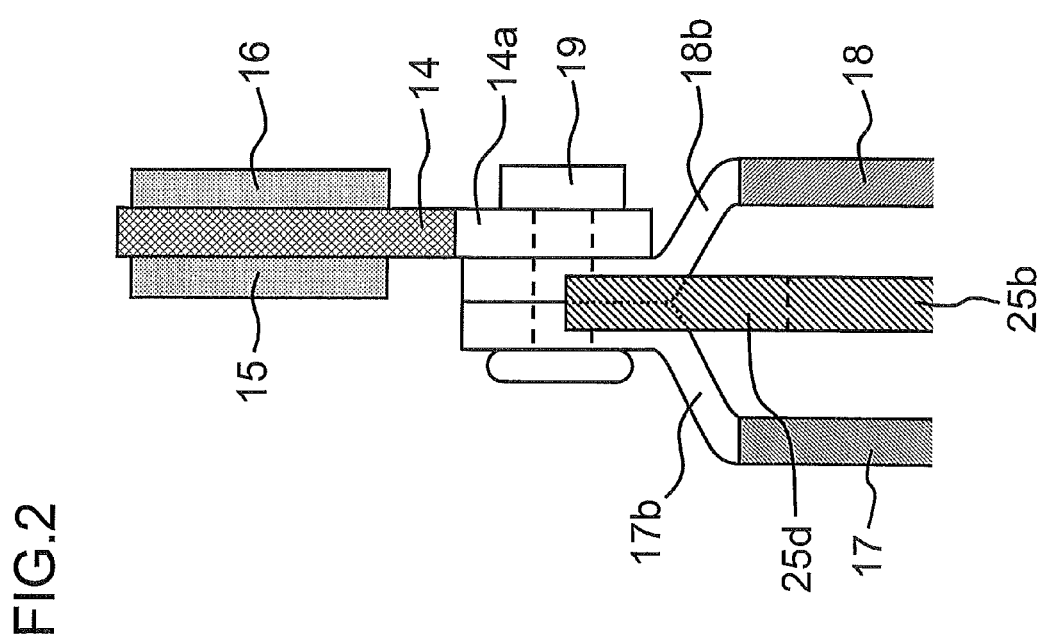
FIG. 2 is a partial enlarged cross-sectional drawing in the radial direction that schematically shows the stopper construction of a damper unit in a torque fluctuation absorber of the first Example.
Figure 3:
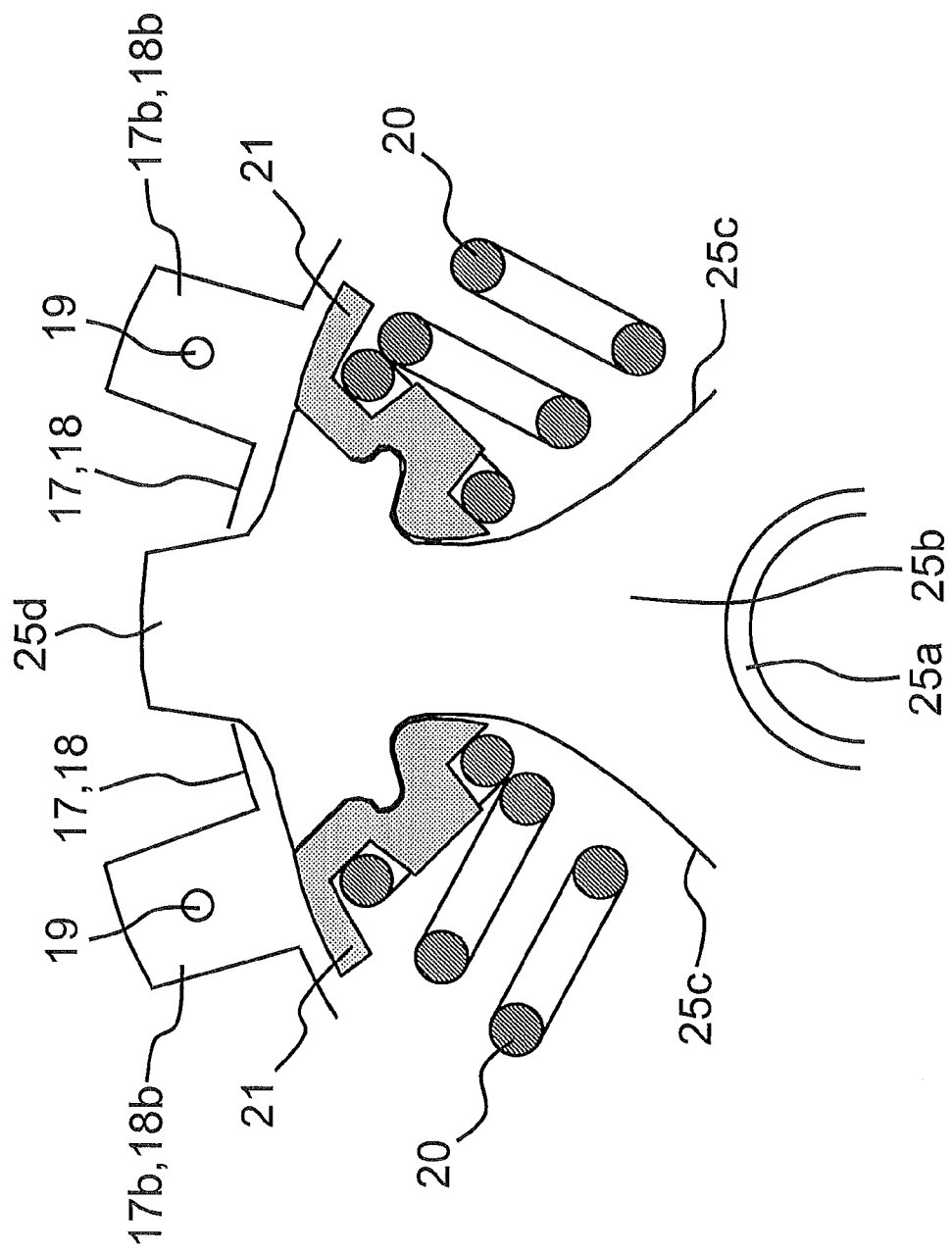
FIG. 3 is a partial enlarged top view that schematically shows the stopper construction of a damper unit in a torque fluctuation absorber of the first Example.

A torque fluctuation absorber of a first embodiment disclosed here is explained using the drawings. FIG. 1 is a cross-sectional drawing in the radial direction that schematically shows the construction of the torque fluctuation absorber of this first Example. FIG. 2 is a partial enlarged cross-sectional drawing in the radial direction that schematically shows the stopper construction of a damper unit in the torque fluctuation absorber of this first Example. FIG. 3 is a partial enlarged top view that schematically shows the stopper construction of a damper unit in the torque fluctuation absorber of this first Example.

The torque fluctuation absorber of this first Example, for instance, is provided in the power transmission path between a rotating shaft 6 on the engine side and a rotating shaft 7 on the transmission side, and is a device that absorbs (suppresses) fluctuating torque due to torsion between the rotating shaft 6 on the engine side and the rotating shaft 7 on the transmission side. The torque fluctuation absorber 1 has a torsion buffering function, and has a damper unit 3 that absorbs fluctuating torque through resilient force (spring force), a hysteresis unit 4 that absorbs (suppresses) fluctuating torque through hysteresis torque due to friction or the like, and a limiter unit 2 that causes slipping to occur when the torsion of a rotating shaft cannot be absorbed by the damper unit 3 or hysteresis unit 4. The damper unit 3 is located in the power transmission path parallel with the hysteresis unit 4. The limiter unit 2 is located in the power transmission path in series with the damper unit 3 and hysteresis unit 4. The torque fluctuation absorber 1 can particularly be applied to a hybrid vehicle in which resonating vibration occurs between the engine and motor.

The torque fluctuation absorber 1 has stopper construction that allows relative rotation between the parts (side plates 17, 18) on the input side of the damper unit 3 and the part (hub member 25) on the output side within a predetermined range, and prevents relative rotation between the parts on the input side and the part on the output side of the damper unit 3 by engaging an outer convex (protruding) section (25d) of the part on the output side with outer convex sections (protruding) (17b, 18b) of the parts on the input side. The torque fluctuation absorber 1 comprises a flywheel 5, bolts 9, cover plate 10, support plate 11, annular spring 12, pressure plate 13, lining plate 14, friction material 15, 16, side plate 17, side plate 18, rivets 19, coil spring 20, seat member 21, thrust member 22, thrust member 23, disk spring 24 and hub member 25.

The flywheel 5 is a ring-shaped member that is installed and fastened to the rotating shaft 6 on the engine side by bolts 8. The cover plate 10 and support plate 11 are installed and fastened to a cylindrical section, which axially protrudes out from the surface of the flywheel 5 on the side of the damper unit 3 near the outer end section, by bolts 9.

The cover plate 10 is a ring-shaped member that is located between the flywheel 5 and support plate 11, and is a component of the limiter unit 2. The outer perimeter portion of the cover plate 10 fits with the support plate 11 and is installed and fastened to the flywheel 5 by bolts 9. The inner perimeter portion of the cover plate 10 is separated from the support plate 11. The cover plate 10 supports the annular spring 12.

The stopper plate 11 is a ring-shaped member that is located on the opposite side (right side in FIG. 1) of the cover plate 10 from the flywheel side 5, and is a component of the limiter unit 2. The outer perimeter portion of the support plate 11 fits with the cover plate 10 and is installed and fastened to the flywheel 5 by bolts 9. The inner perimeter portion of the support plate 11 is separated from the cover plate 10. The support plate 11 supports the pressure plate 13 so that relative rotation is not possible and so that movement in the axial direction is possible. The sliding surface on the inner perimeter portion of the support plate 11 comes in pressure contact with the friction material 16 so that sliding is possible.

The annular disk spring 12 is a disk shaped spring that is located between the cover plate 10 and the pressure plate 13, and is a component of the limiter unit 2. The annular disk spring 12 presses the pressure plate 13 toward the side of the friction material 15.

The pressure plate 13 is a ring-shaped member that is located between the annular spring 12 and friction material 15. The pressure plate 13 is supported by engaging by its axial protrusion with the support plate 11 so that it does not rotate relative to the support plate 11 and so that it can move in the axial direction. The pressure plate 13 is pressed toward the side of the friction material 15 by the annular disk spring 12, and the sliding surface thereof comes in pressure contact with the friction material 15 so that sliding is possible.

The lining plate 14 is a ring-shaped member that is located between the friction materials 15, 16 between the support plate 11 and pressure plate 13. The lining plate 14 is located on the opposite side of the flange section 25b from the side of the side plate 17. The lining plate 14 has an inner convex section (protrusion) 14a on the inner perimeter end section that protrudes toward the inner side. The inner convex section 14a is located on the opposite side of the outer convex section (protrusion) 18b of the side plate 18 from the outer convex section 17b. The inner convex section 14a is fastened together with the outer convex sections 17b, 18b of the side plates 17, 18 by rivets 19. The friction materials 15, 16 are installed and fastened to the outer perimeter portion of the lining plate 14 by adhesive or the like.

The friction material 15 is a component of the limiter unit 2, and is located between the lining plate 14 and the pressure plate 13. The friction material 15 is formed in a ring shape. The friction material 15 is installed and fastened to the lining plate 14 by rivets, adhesive or the like. The friction material 15 comes in pressure contact with the pressure plate 13 so that sliding is possible.

The friction material 16 is a component of the limiter unit 2, and is located between the lining plate 14 and support plate 11. The friction material 16 is formed into a ring shape. The friction material 16 is installed and fastened to the lining plate by rivets, adhesive or the like. The friction material 16 comes in pressure contact with the support plate 11 so that sliding is possible.

The side plate 17 is a ring-shaped member that is located on the engine side (left side in FIG. 1) relative to the flange unit 25b of the hub member 25, and is a component of the damper unit 3 and hysteresis unit 4. The side plate 17 has an external convex (protrusion) section 17b on the outer perimeter portion that protrudes outward (see FIG. 2 and FIG. 3). The outer convex section 17b is bent (pressed) toward the side of the side plate 18 and fits with the outer convex (protrusion) section 18b of the side plate 18 and is integrated with and fastened together with the inner convex section 14a of the lining plate 14 and outer convex section 18b of the side plate 18 by rivets 19. The outer convex section 17b, together with the outer convex section 18b of the side plate 18, functions as a stopper that prevents relative rotation between the side plates 17, 18 and the hub member 25 by contacting to the outer convex section 25d of the hub member 25, when relative rotation occurs between the side plates 17, 18 and the hub member 25. As shown in FIG. 3 in the circumferential direction of the side plates 17, 18 the outer convex section 25d of the hub member 25 is possible within a range (interval) spanning between the adjacent outer convex sections 18b, 17b, and relative rotation between the side plates 17, 18 and the hub member 25 is allowed. The main section of the side plate 17 is separated from the main section of the side plate 18, and is also separated from the flange section 25b. The side plate 17 has a window section 17a in the damper unit 3 in the middle portion for accommodating the coil spring 20 and seat member 21, and the end surface in the circumferential direction of that window section 17a comes in contact with the seat member 21 so that separation is possible. In the hysteresis unit 4 further inward than the damper unit 3, the side plate 17 comes in pressure contact with the slide material 22 so that sliding is possible. The inner end surface of the side plate 17 is supported by the hub member 25 (hub unit 25a) via the slide member 22 so that relative rotation is possible.

The side plate 18 is a ring-shaped member that is located on the motor side (right side in FIG. 1) of the flange unit 25b of the hub member 25, and is a component of the damper unit 3 and hysteresis unit 4. The portion near the outer end section of the side plate 18 is integrated with and fastened together with the lining plate 14 and side plate 17 by rivets. The side plate 18 has an external convex section 18b on the outer perimeter portion that protrudes outward (see FIG. 2 and FIG. 3). The outer convex section 18b bends (narrows) toward the side of the side plate 17, fits with the outer convex section 17b of the side plate 17, is located between the outer convex section 17b and the inner convex section 14a of the lining plate 14, and is integrated with and fastened together with the inner convex section 14a of the lining plate 14 and outer convex section 17b of the side plate 17 by rivets 19. The outer convex section 18b, together with the outer convex section 17b of the side plate 17, functions as a stopper that prevents relative rotation between the side plates 17, 18 and the hub member 25 by contacting to the outer convex section 25d of the hub member 25, when relative rotation occurs between the side plates 17, 18 and the hub member 25. As shown in FIG. 3, in the circumferential direction of the side plates 17, 18 the outer convex section 25d of the hub member 25 is possible within the range (interval) spanning between the adjacent outer convex sections 18b, 17b, and relative rotation between the side plates 17, 18 and the hub member 25 is allowed. The main section of the side plate 18 is separated from the main section of the side plate 17, and is also separated from the flange section 25b. The side plate 18 has a window section 18a in the damper unit 3 in the middle portion for accommodating the coil spring 20 and seat member 21, and the end surface in the circumferential direction of that window section 18a comes in contact with the seat member 21 so that separation is possible. In the hysteresis unit 4, further inward than the damper unit 3, the side plate 18 supports the (annular) disk spring 24. The inner end surface of the side plate 17 is supported by the hub member 25 (hub unit 25a) via the slide member 23 so that relative rotation is possible.

The rivets 19 are members for integrally fastening the inner convex section 14a of the lining plate 14, the outer convex section 17b of the side plate 17 and the outer convex section 18b of the side plate 18.

The coil spring 20 is a component of the damper unit 3, is housed in the window sections 17a, 18a, 25c that are formed in the side plates 17, 18 and the hub member 25 (flange section 25b), and comes in contact with the seat members that are located on both ends. The coil spring 20 is compressed when there is relative rotation between the side plates 17, 18 and the hub member 25, and absorbs shock due to the difference in rotation of the side plates 17, 18 and hub member 25. A straight-shaped spring or unit in which a straight shaped spring is curved and assembled can be used as the coil spring 20, however, in order to achieve large tension, an arc-shaped spring that is curved in the circumferential direction can also be used.

The seat member 21 is a component of the damper unit 3, is housed in the window sections 17a, 18a 25c that are formed in the side plates 17, 18 and hub member 25 (flange section 25b), and is located between the end surfaces in the circumferential direction of the window sections 17a, 18a, 25c and the end section of the coil spring 20. Resin can be used in order to reduce the friction of the coil spring 20.

The thrust member 22 is a component of the hysteresis unit 4, and is a ring-shaped member that is located between the side plate 17 and the hub member 25. The thrust member 22, in the axial direction, is between the side plate 17 and the flange section 25b, and comes in pressure contact with the side plate 17 and flange section 25b so that sliding is possible. The thrust member 22, in the radial direction, is between the side plate 17 and the hub section 25a, and functions as a sliding bearing (bushing) for supporting the side plate 17 such that it can rotate relative to the hub section 25a.

The thrust member 23 is a component of the hysteresis unit 4, and is a ring-shaped member that is located between the side plate 18 and the hub member 25. The thrust member 23, in the axial direction, is located between the disk spring 24 and flange section 25b, is pressed toward the side of the flange section 25b by the disk spring 24, and comes in pressure contact with the flange section 25b so that sliding is possible. The thrust member 23, in the radial direction, is located between the side plate 18 and the hub section 25a, and functions as a sliding bearing (bushing) for supporting the side plate 18 such that it can rotate relative to the hub section 25a.

The (annular) disk spring 24 is a component of the hysteresis unit 4, is located between the thrust member 23 and side plate 18, and is a disk-shaped spring that presses the thrust member 23 toward the flange section 25b.

The hub member 25 is a member that outputs rotation power from the damper unit 3 and hysteresis unit 4 toward the transmission side, and it is a component of the damper unit 3 and hysteresis unit 4. The hub member 25 has a flange section 25b that extends from a predetermined location on the perimeter of the hub section 25a. The inner surface of the hub section 25a has a spline joint with the rotating shaft 7 on the transmission side. The outer surface of the hub section 25a supports side plates 17, 18 via the thrust members 22, 23 so that relative rotation is possible. The flange section 25b has a window section 25c in the damper unit 3 on the outer perimeter side for accommodating the coil spring 20 and seat member 21, and the end surface in the circumferential direction of that window section 25c comes in contact with the sheet material 21 so that separation is possible. The surface of the flange section 25b in the axial direction of the hysteresis unit 4 that is further on the inner side than the damper unit 3 is held between the thrust members 22, 23 so that sliding is possible. The flange section 25b has an outer convex section 25d on the outer perimeter end section that protrudes outward (see FIG. 2 and FIG. 3). When there is relative rotation between the side plates 17, 18 and the hub member 25, the outer convex section 25d can move in the circumferential direction of the side plates 17, 18 in a range between the adjacent outer convex sections 17b, 18b of the side plates 17, 18, which form a stopper, and by contact of the outer convex section 25d to the outer convex sections 17b, 18b, relative rotation between the side plates 17, 18 and the hub member 25 is prevented.

With this first Example, with the lining plate 14 being located on the transmission side (right side in FIG. 1) of the outer convex sections 17b, 18b of the side plates 17, 18, the damper unit 3, which is further radially inward than the limiter unit 2, can be moved toward the side of the flywheel 5 (left side in FIG. 1), so the device can be made compact, and space efficiency in the axial direction can be improved. Moreover, even with this construction, there are no additional parts when compared with a conventional torque fluctuation absorber, so there is not increase in cost. The lining plate 14 can also be located on the opposite side of the flange section 25b of the hub member 25 from the side of the side plate 18.

EXAMPLE 2

Figure 4:
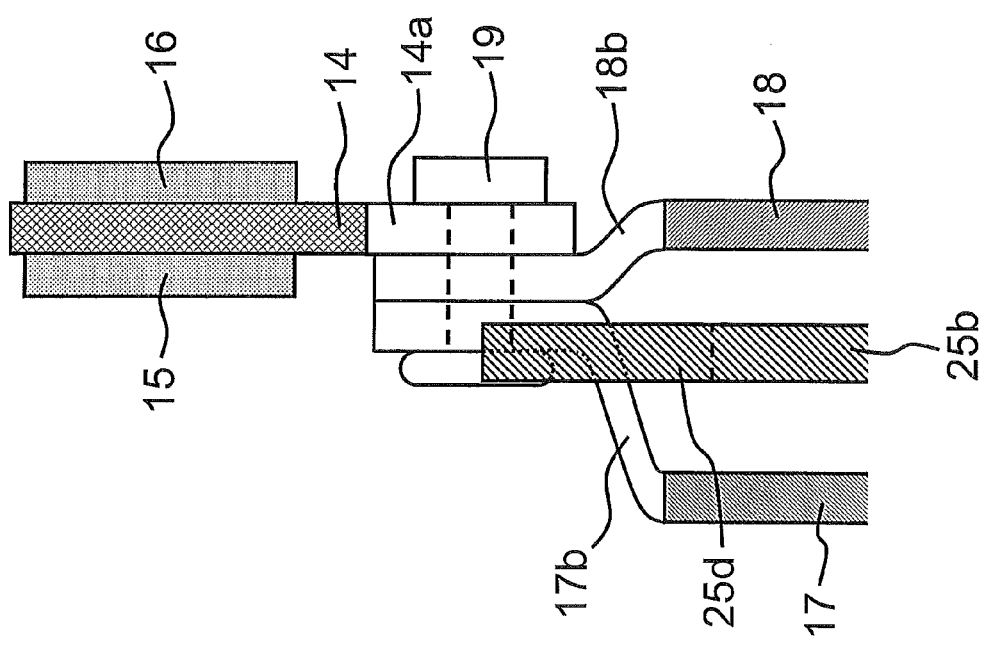
FIG. 4 is a partial enlarged cross-sectional drawing in the radial direction that schematically shows the stopper construction of a damper unit in a torque fluctuation absorber of the second Example.
Figure 5:
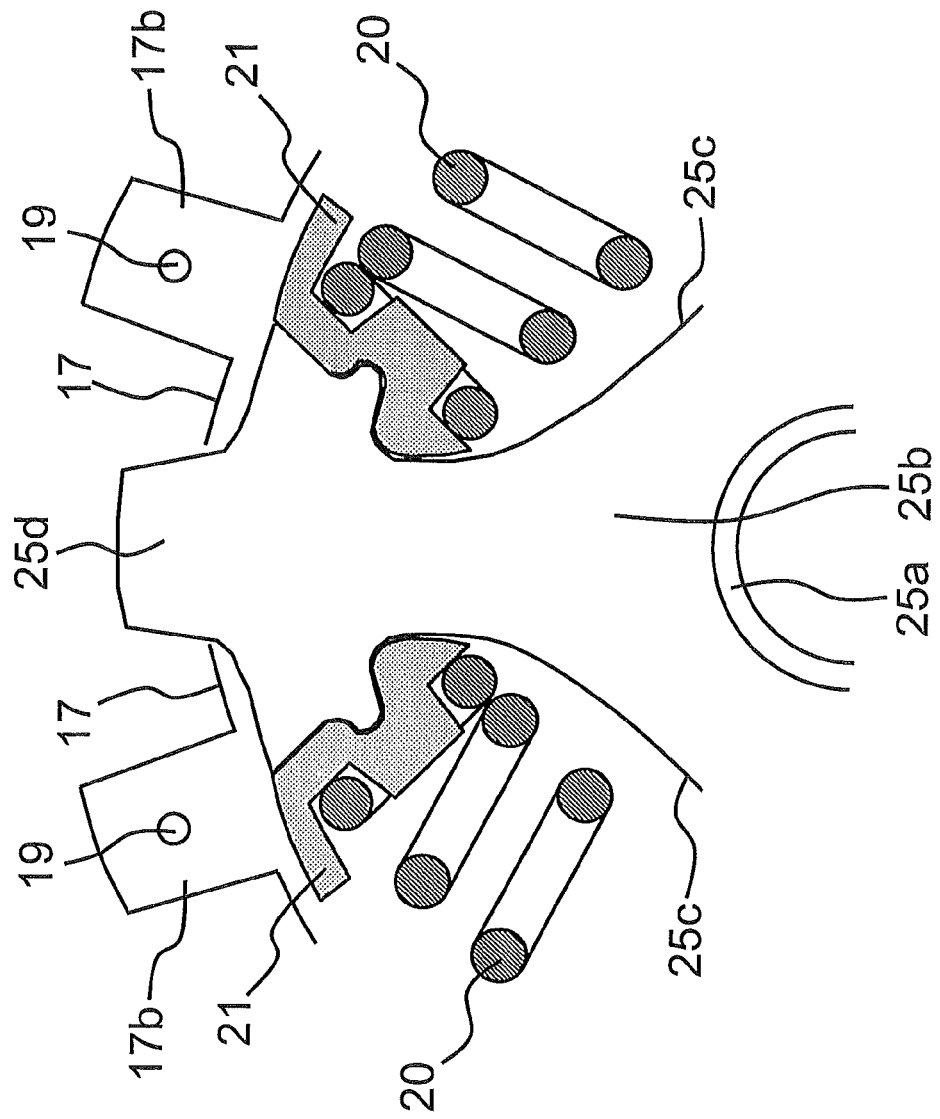
FIG. 5 is a partial enlarged top view that schematically shows the stopper construction of a damper unit in a torque fluctuation absorber of the second Example.

A torque fluctuation absorber of a second Example is explained using the drawings. FIG. 4 is a partial enlarged cross-sectional drawing in the radial direction that schematically shows the stopper construction of a damper unit in the torque fluctuation absorber of this second Example. FIG. 5 is a partial enlarged top view that schematically shows the stopper construction in a damper unit in the torque fluctuation absorber of this second Example.

This second Example is a variation of the first Example (see FIG. 2), where construction is such that the bend in the outer convex section 17b of the side plate 17 toward the side of the side plate 18 is made large, the bend of the outer convex section 18b of the side plate 18 toward the side of the side plate 17 is made relatively small, and the outer convex sections 17b of the side plate 17 contacts to the outer convex section 25d of the hub member (corresponds to 25 in FIG. 1) (see FIG. 4). When there is relative rotation between the side plates 17, 18 and the hub member (corresponds to 25 in FIG. 1), the outer convex section 25d of the hub member (corresponds to 25 in FIG. 1) can move in the circumferential direction of the side plate 17 within a range (interval) spanning between the adjacent outer convex sections 17b of the side plate 17, and by contact of the outer convex section 25d of the hub member to an outer convex section 17b of the side plate 17, relative rotation between the side plates 17, 18 and the hub member (corresponds to 25 in FIG. 1) is prevented (see FIG. 5). The other construction is the same as that of the first Example.

With the second Example, together with having the same effect as the first Example, the damper unit (corresponds to 3 in FIG. 1) can be moved further toward the side of the flywheel (corresponds to 5 in FIG. 1) than in the first Example, so the device can be made even more compact, and the space efficiency in the axial direction can be improved even more than in case of the first Example.

EXAMPLE 3

Figure 6:
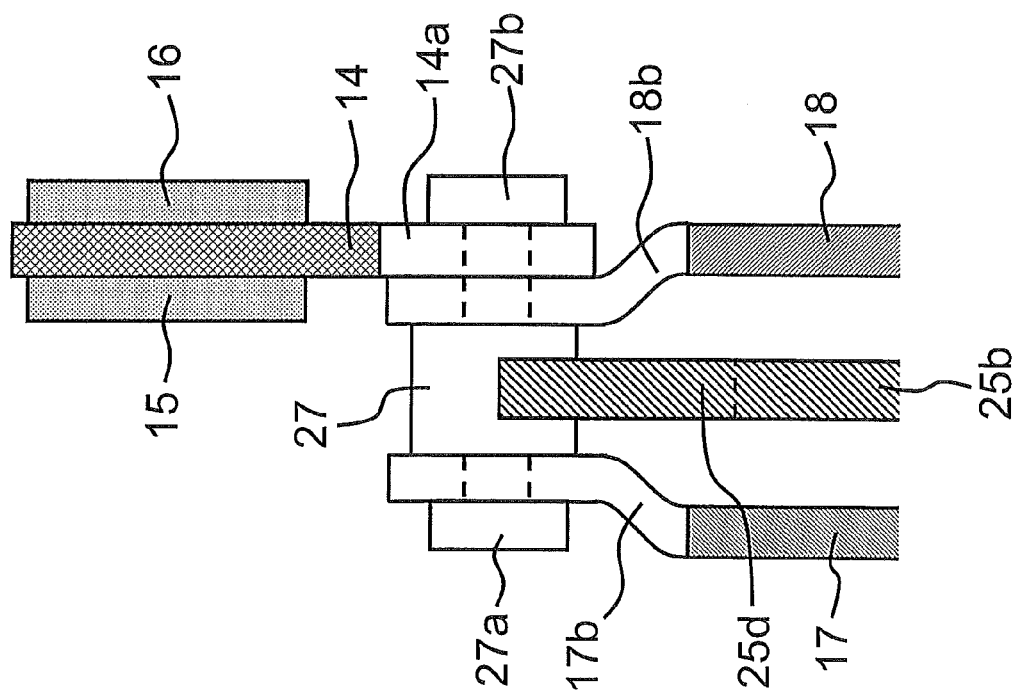
FIG. 6 is a partial enlarged cross-sectional drawing in the radial direction that schematically shows the stopper construction of a damper unit in a torque fluctuation absorber of the third Example.
Figure 7:
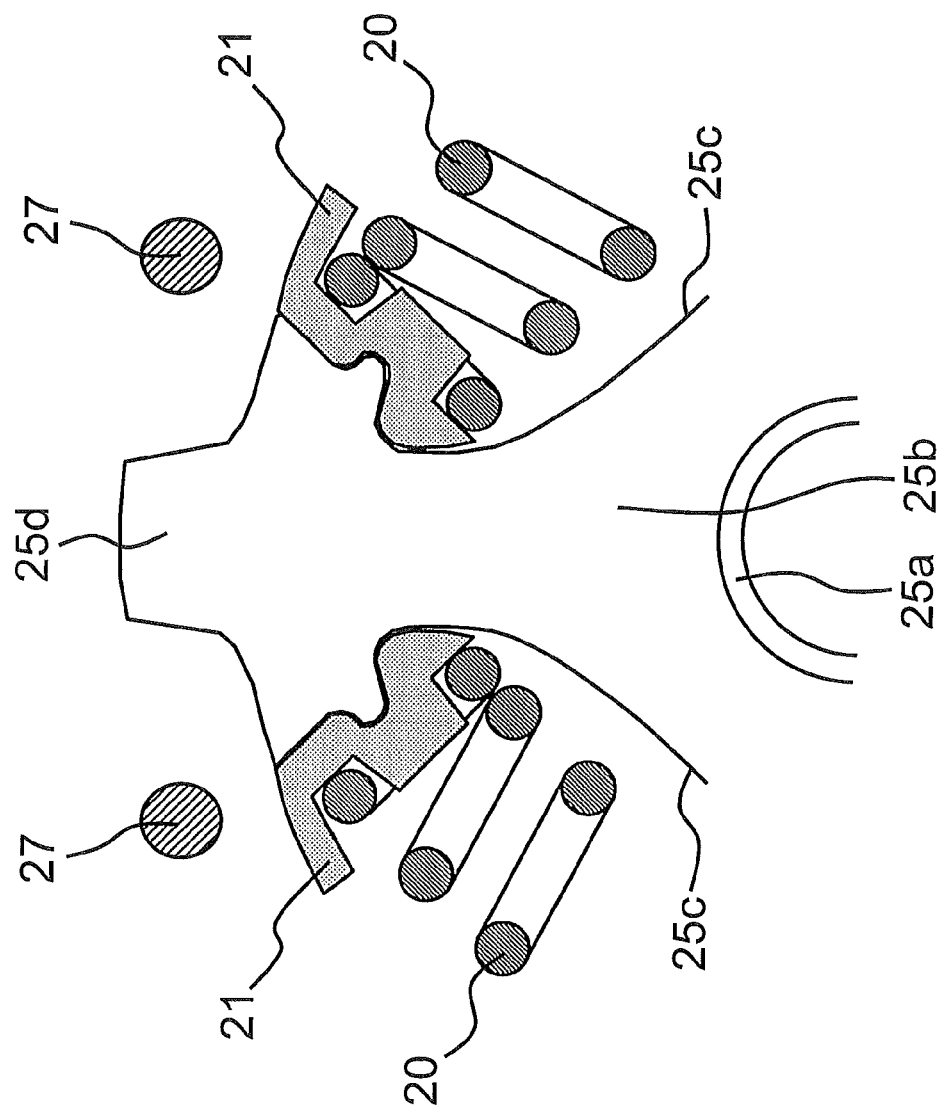
FIG. 7 is a partial enlarged top view that schematically shows the stopper construction of a damper unit in a torque fluctuation absorber of the third. Example.

A torque fluctuation absorber of a third Example is explained using the drawings. FIG. 6 is a partial enlarged cross-sectional drawing in the radial direction that schematically shows the stopper construction of a damper unit in a torque fluctuation absorber of this third Example. FIG. 7 is a partial enlarged top elevational side view of the stopper construction of a damper unit in a torque fluctuation absorber of this third Example.

This third Example is a variation of the first Example (see FIG. 2), where construction is such that there are stopper members 27 between the outer convex sections 17b, 18b of the side plates 17, 18, with the portion that extends from one end of the stopper member 27 being inserted into a hole that is formed in the outer convex section 17b and crimped (form a crimped section 27a), and the portion that extends from the other end of the stopper member 27 being inserted into holes that are formed in the outer convex section 18b and inner convex section 14a and crimped (form a crimped section 27b), where the main portion of the stopper member 27 contacts to the outer convex section 25d of the hub member (corresponds to 25 in FIG. 1) (see FIG. 6). The main portion of the stopper member 27 has a diameter that is larger than the portion that is inserted into the holes in the outer convex sections 17b, 18b and inner convex section 14a, the side plate 17 is fastened against the surface in the axial direction of the main portion of the stopper member 27 by the crimped section 27a, and the side plate 18 and lining plate 14 are fastened against the surface in the axial direction of the main portion of the stopper member by the crimped section 27b. The length of the crimped section 27b in the longitudinal direction of the stopper member 27 is longer than that of the crimped section 27a. When a relative rotation occurs between the side plates 17, 18 and the hub member (corresponds to 25 in FIG. 1), the outer convex section 25d of the hub member (corresponds to 25 in FIG. 1) can move in the circumferential direction of the side plate 17 within the range (interval) between the adjacent stopper members 27, and by contact of the outer convex section 25d to a stopper member 27, relative rotation between the side plates 17, 18 and the hub member (corresponds to 25 in FIG. 1) is prevented (see FIG. 7). The other construction is the same as that of the first Example.

With this third Example, the same effect as the first Example is obtained.

EXAMPLE 4

Figure 8:
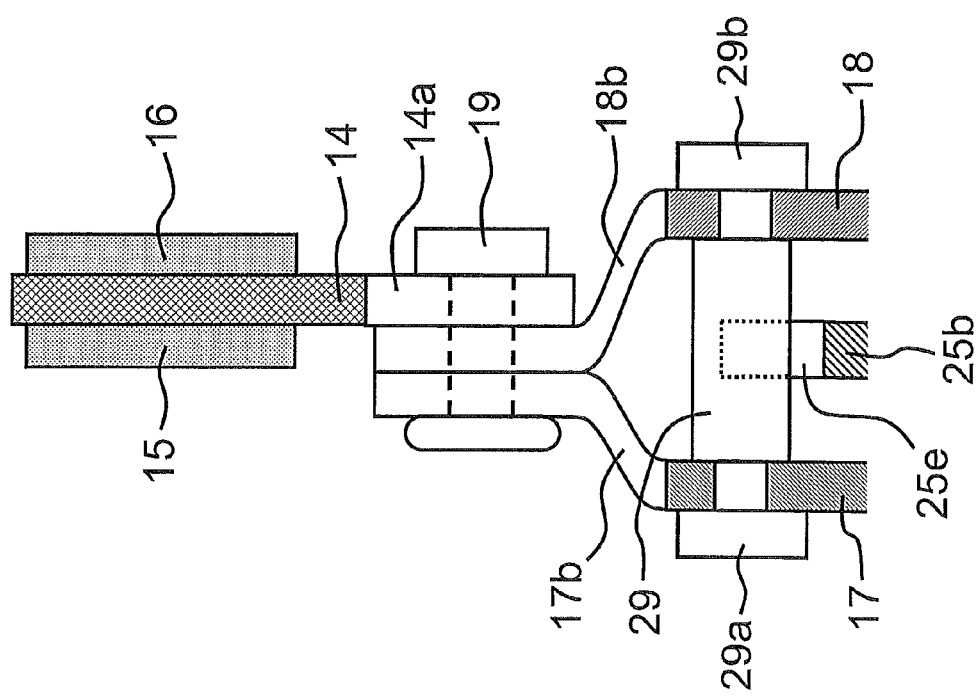
FIG. 8 is a partial enlarged cross-sectional drawing in the radial direction that schematically shows the stopper construction of a damper unit in a torque fluctuation absorber of the fourth Example.
Figure 9:
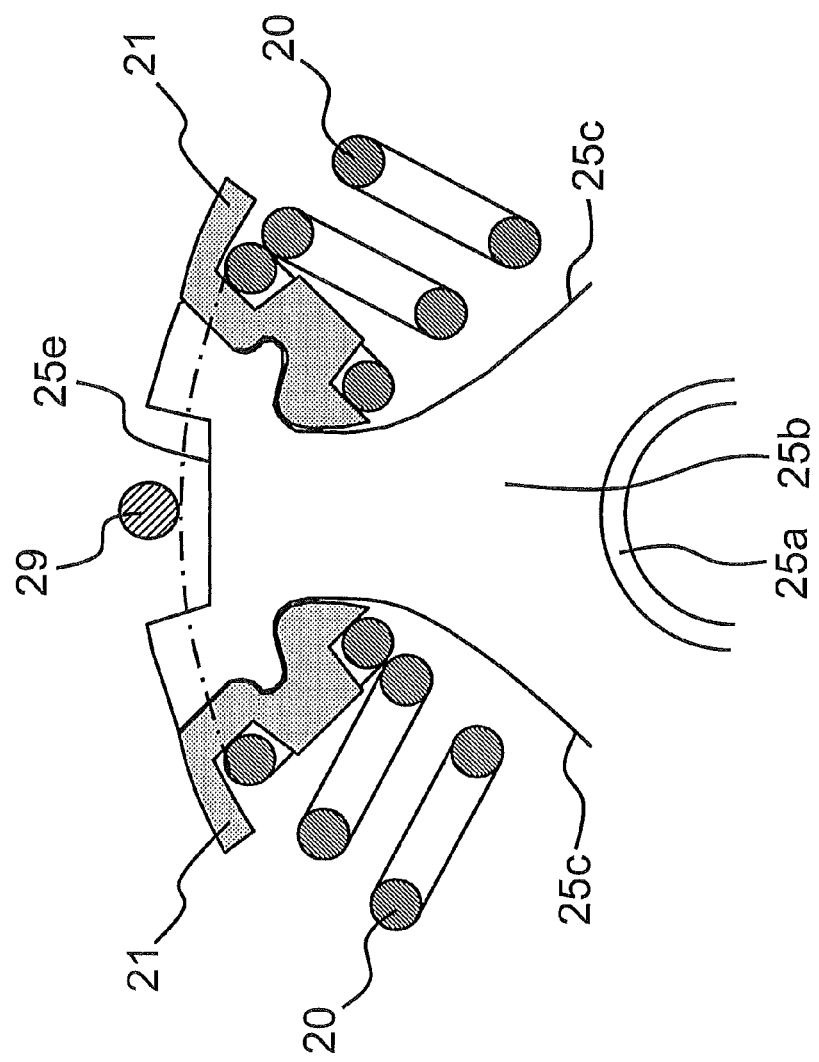
FIG. 9 is a partial enlarged top view that schematically shows the stopper construction of a damper unit in a torque fluctuation absorber of the fourth Example.
Figure 10:
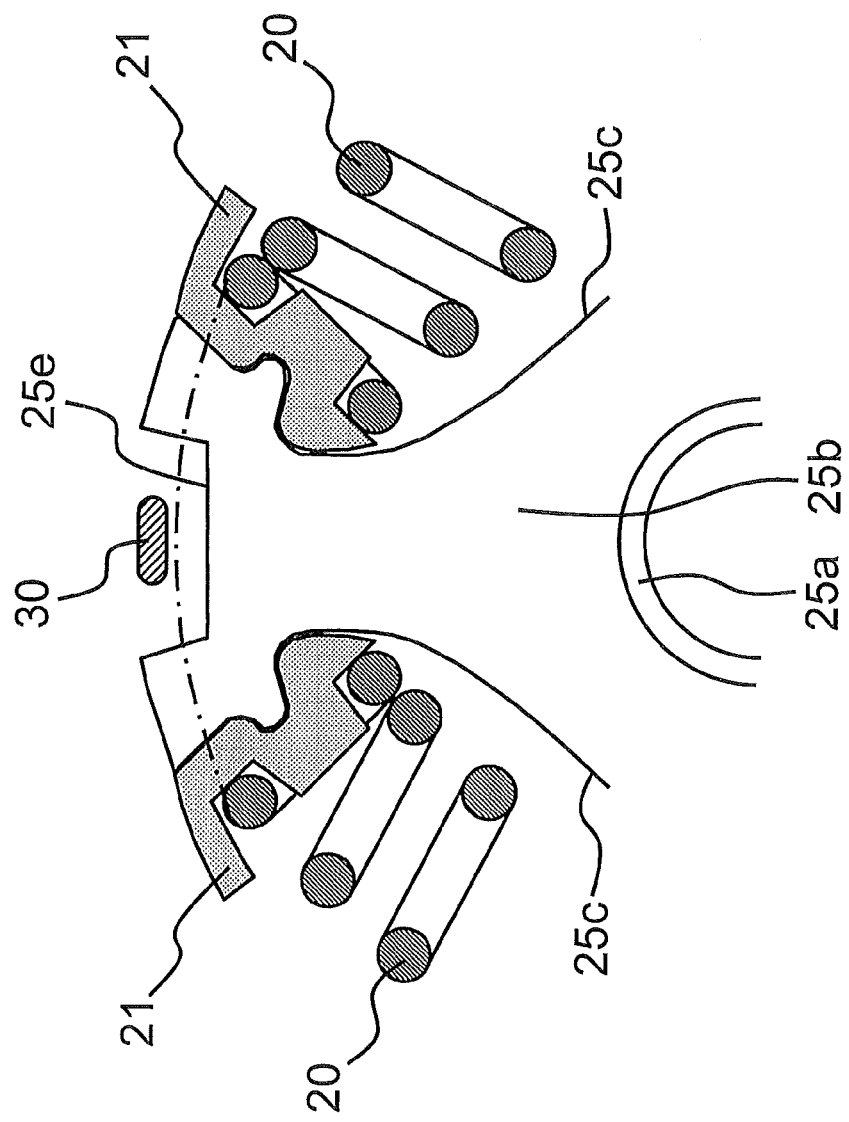
FIG. 10 is a partial enlarged top view that schematically shows a first variation of stopper construction of a damper unit in a torque fluctuation absorber of the fourth Example.
Figure 11:
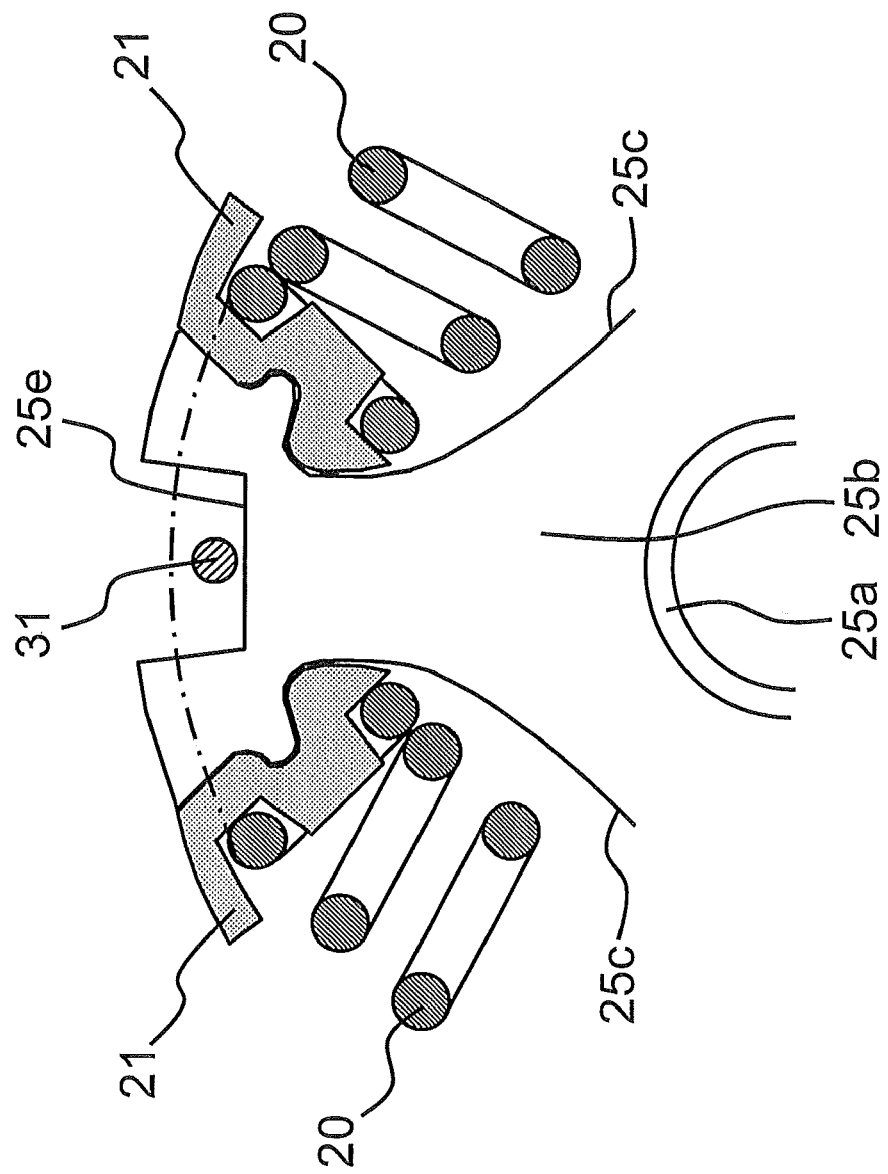
FIG. 11 is a partial enlarged top view that schematically shows a second variation of stopper construction of a damper unit in a torque fluctuation absorber of the fourth Example.

A torque fluctuation absorber of a fourth Example is explained using the drawings. FIG. 8 is a partial enlarged cross-sectional drawing in the radial direction that schematically shows the stopper construction of a damper unit in a torque fluctuation absorber of this fourth Example. FIG. 9 is a partial enlarged side view of the top portion that schematically shows the stopper construction of a damper unit in a torque fluctuation absorber of this fourth Example of this disclosure. FIG. 10 is a partial enlarged top view that schematically shows a first variation of the stopper construction of a damper unit in a torque fluctuation absorber of this fourth Example. FIG. 11 is a partial enlarged view that schematically shows a second variation of the stopper construction of a damper unit in a torque fluctuation absorber of this fourth Example.

The fourth Example is a variation of the first Example (see FIG. 2) where construction is such that an outer convex section (25d in FIG. 1) on the hub member (corresponds to 15 in FIG. 1) is not formed, rather an outer concave section 25e that indents inward is formed on the outer perimeter end surface of the flange section 25b of the hub member (corresponds to 25 of FIG. 1), a stopper member 29 is located between the side plate 17 and side plate 18, with the portion that extends from one end of the stopper member 29 being inserted into a hole that is formed in the side plate 17 and crimped (forming a crimped section 29a), the portion that extends from the other end of the stopper member 29 being inserted into a hole that is formed in the side plate 18 and crimped (forming a crimped section 29b), and the main portion of the stopper member 29 contacts to the end wall surface of the outer concave section 25e of the hub member (corresponds to 25 in FIG. 1) (see FIG. 8). The diameter of the main portion of the stopper member 29 is greater than the portions that are inserted into the holes in the side plates 17, 18, the side plate 17 is fastened to a surface in the axial direction of the main portion of the stopper member 29 by the crimped section 29a, and the side plate 18 is fastened to a surface in the axial direction of the main portion of the stopper member 29 by the crimped section 29b. When there is relative rotation between the side plates 17, 18 and the hub member (corresponds to 25 in FIG. 1), the main portion of the stopper member 29 can move in the circumferential direction of the side plates 17, 18 within the range (interval) between the end wall surface of the adjacent outer concave section 25e of the hub member (corresponds to 25 in FIG. 1), and by contact of the main portion of the stopper member 29 to the end wall surface of the outer concave section 25e, relative rotation between the side plates 17, 18 and the hub member (corresponds to 25 in FIG. 1) is prevented (see FIG. 9). The cross-sectional shape of the stopper member 29 is not limited to a circular shape, and as shown in FIG. 10, a stopper member 30 whose cross-sectional shape of the main portion is a flat cross-sectional shape (shape that is long in the circumferential direction and short in the radial direction) is possible. By doing so, the device can be made compact in the radial direction. Moreover, in FIG. 9, the main portion of the stopper member 29 may be located further outward in the radial direction than the most outer side of the coil spring 20, however, as shown in FIG. 11, the main portion of the stopper member 31 can be located further inward in the radial direction than the most outer side of the coil spring 20. By doing so, the device can be made compact in the radial direction. The other construction is the same as that of the first Example.

In addition, to the similar effects as the first Example by not forming an outer convex section (25d in FIG. 1) on the hub member (corresponds to 25 in FIG. 1), but rather forming an outer concave section 25e that indents inward on (from) the outer perimeter end surface of the flange section 25b of the hub member (corresponds to 25 in FIG. 1), the device can be made compact in the radial direction.

EXAMPLE 5

Figure 12:
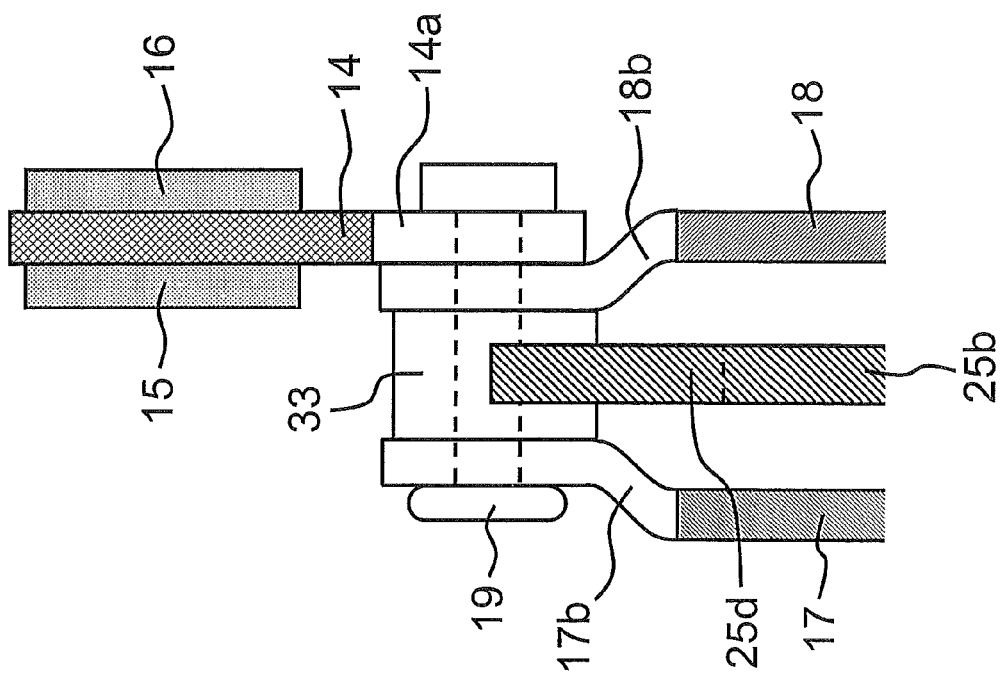
FIG. 12 is a partial enlarged cross-sectional drawing in the radial direction that schematically shows the stopper construction of a damper unit in a torque fluctuation absorber of the fifth Example.
Figure 13:
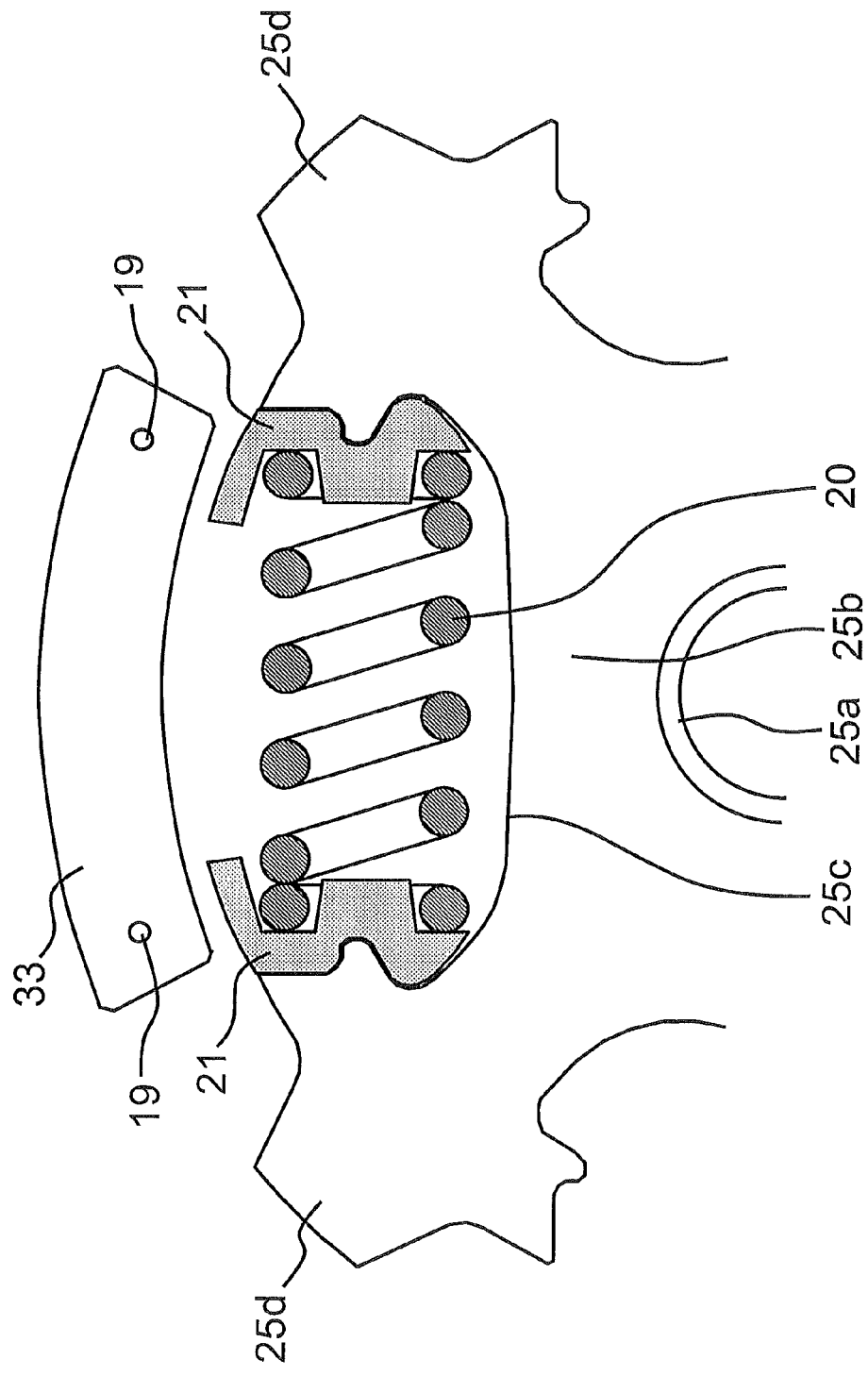
FIG. 13 is a partial enlarged top view that schematically shows the stopper construction of a damper unit in a torque fluctuation absorber of the fifth Example.

A torque fluctuation absorber of a fifth Example is explained using the drawings. FIG. 12 is a partial enlarged cross-sectional drawing in the radial direction that schematically shows stopper construction of a damper unit in a torque fluctuation absorber of this fifth Example. FIG. 13 is a partial enlarged side view that schematically shows stopper construction of a damper unit in a torque fluctuation absorber of this fifth Example.

The fifth Example is a variation of the first Example (see FIG. 2) where construction is used in which there is a plate-shaped stopper member 33 (having no crimped sections) between the outer convex sections 17b, 18b of the side plates 17, 18, rivets are inserted into holes that are formed in the outer convex sections 17b, 18b and inner convex section 14a and crimped, and the stopper member 33 contacts to the outer convex sections 25d of the hub member (corresponds to 25 in FIG. 1) by the stopper member 33 (see FIG. 12). When there is relative rotation between the side plates 17, 18 and the hub member (corresponds to 25 in FIG. 1), the stopper member 33 can move in the circumferential direction of the side plates 17, 18 within the range (interval) between neighboring two outer convex sections 25d of the hub member (corresponds to 25 in FIG. 1), and by contact of the stopper member 33 to an outer convex section 25d, relative rotation between the side plates 17, 18 and the hub member (corresponds to 25 in FIG. 1) is prevented (see FIG. 13). The other construction is the same as that of the first Example.

With this fifth Example, by using construction in which the lining plate 14 is located on the transmission side (right side in FIG. 1) of the adjacent outer convex section 18b of the side plate 18, the damper unit 3, which is disposed further radially inside than the limiter unit 2, can be moved toward the side of the flywheel 5 (left side in FIG. 1), so the device can be made compact, and space efficiency in the axial direction can be improved. By forming (manufacturing) the stopper member 33 together with other members (from the same plate material upon stamping), it is possible to keep costs from increasing.

EXAMPLE 6

Figure 14:
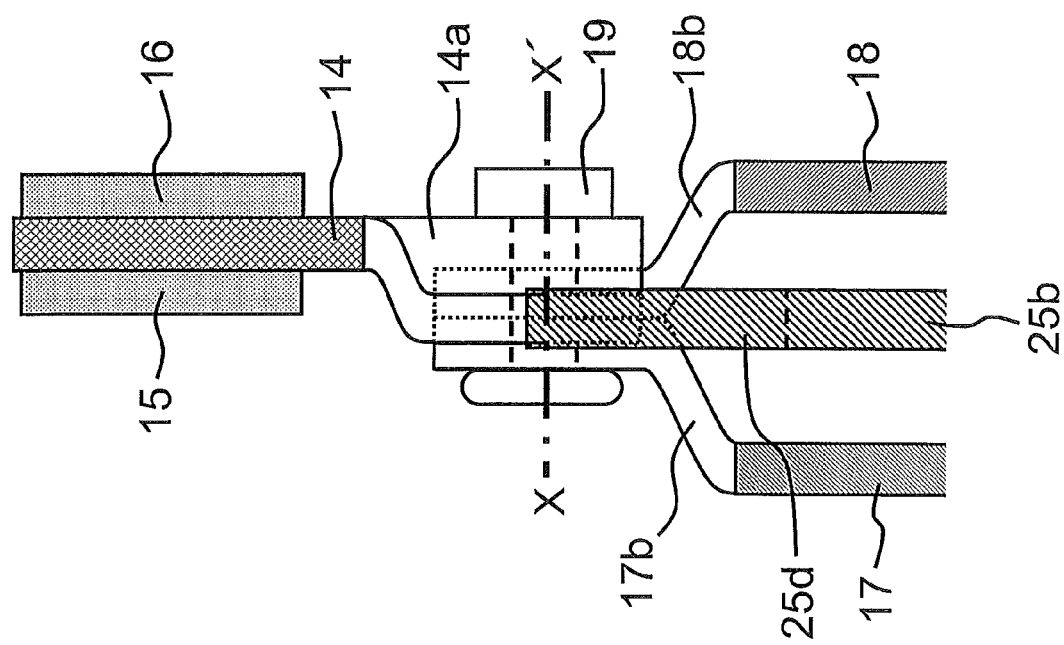
FIG. 14 is a partial enlarged cross-sectional drawing in the radial direction that schematically shows the stopper construction of a damper unit in a torque fluctuation absorber of the sixth Example.
Figure 15:
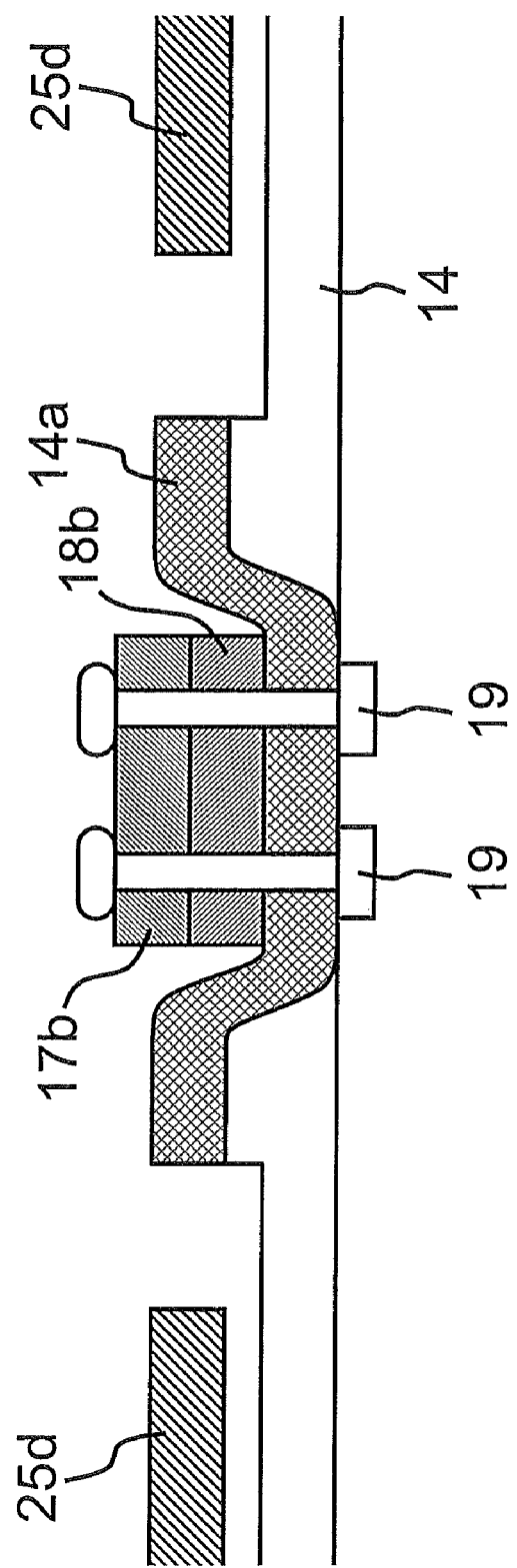
FIG. 15 is a partial cross-sectional drawing in the circumferential direction of section X-X' in FIG. 14 that schematically shows the stopper construction of a damper unit in a torque fluctuation absorber of the sixth Example.
Figure 16:
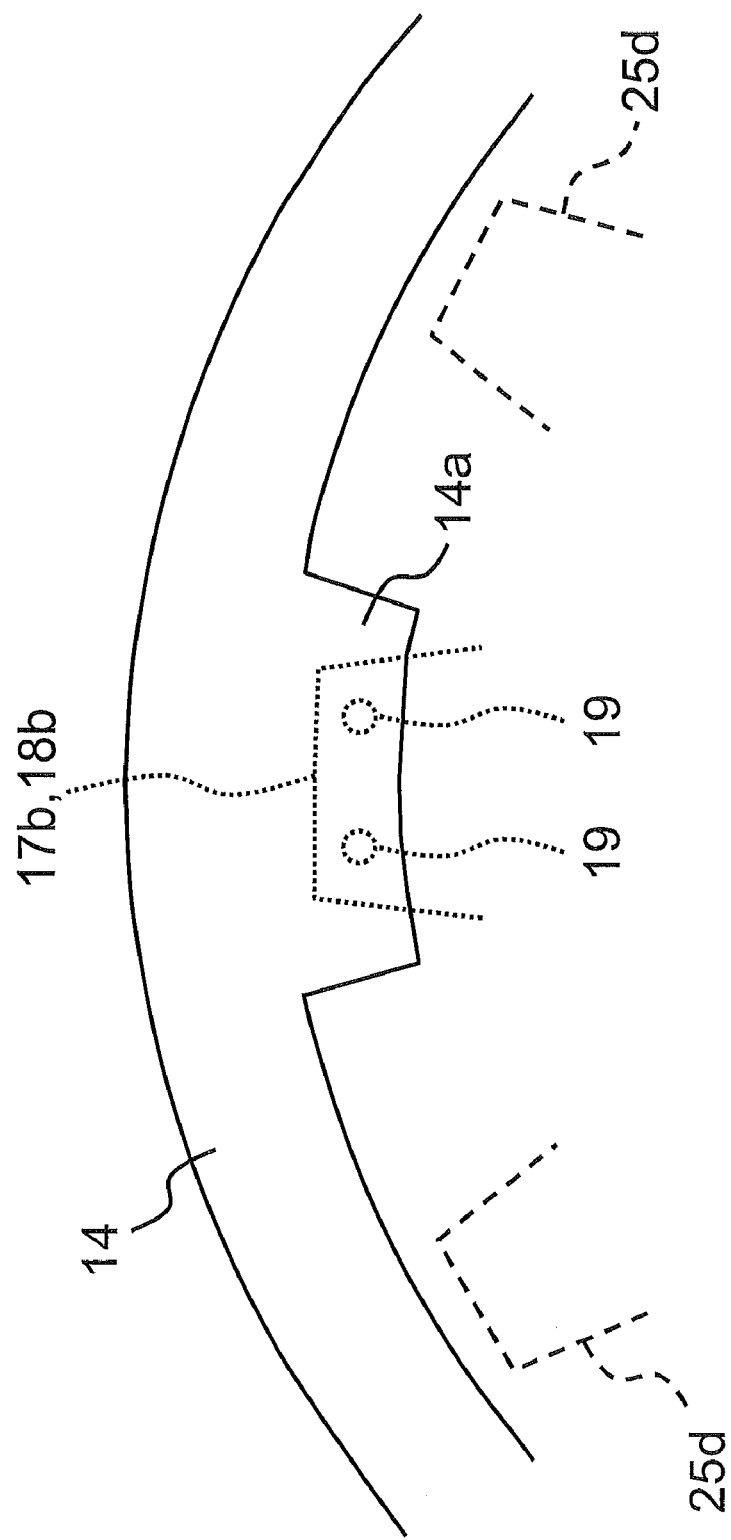
FIG. 16 is a partial enlarged top view that schematically shows the stopper construction of a damper unit in a torque fluctuation absorber of the sixth Example.

A torque fluctuation absorber of a sixth Example is explained using the drawings. FIG. 14 is a partial enlarged cross-sectional drawing in the radial direction that schematically shows stopper construction of a damper unit in a torque fluctuation absorber of a sixth Example. FIG. 15 is a partial cross-sectional drawing in the circumferential direction of section X-X' in FIG. 14 that schematically shows stopper construction of a damper unit in a torque fluctuation absorber of this sixth Example. FIG. 16 is a partial enlarged view that schematically shows stopper construction of a damper unit in a torque fluctuation absorber of this sixth Example.

This sixth Example is a variation of the first Example (see FIG. 2), where construction is used in which part of the inner convex section 14a of the lining plate 14 is bent so as to extend between outer convex sections 17b, 18b of the side plates 17, 18 and to be within an interval between the adjacent outer convex sections 25d of the hub member (corresponds to 25 in FIG. 1), and the inner convex section 14a (end sections in the circumferential direction) contacts to the outer convex sections (25d) (see FIG. 14 and FIG. 15). Except for the bent portion, the construction of the inner convex section 14a of the lining plate 14 is the same as that of the first Example, and is located further on the transmission side (right side in FIG. 14) than the outer convex section 18b of the side plate 18 and fastened by crimped rivets 19 on the transmission side (right side in FIG. 14) of the outer convex sections 17b, 18b of the side plates 17, 18. The bent portion of the inner convex section 14a of the lining plate 14 is formed by pressing. When relative rotation occurs between the side plates 17, 18 and the hub member (corresponds to 15 in FIG. 1), bent portion of the inner convex section 14a of the lining plate 14 is located on the (orbital line) (track) of the outer convex sections 25d of the hub member (corresponds to 25 in FIG. 1). When there is relative rotation between the side plates 17, 18 and the hub member (corresponds to 25 in FIG. 1), the inner convex section 14a can move in the circumferential direction of the side plates 17, 18 within a range (interval) between the adjacent outer convex sections 25d of the hub member (corresponds to 25 in FIG. 1), and by contact of the inner convex section 14a to an outer convex section 25d, relative rotation between the side plates 17, 18 and the hub member (corresponds to 25 in FIG. 1) is prevented (see FIG. 16). The other construction is the same as that of the first Example.

With this sixth Example, by using construction in which the lining plate 14 is located on the transmission side (right side in FIG. 1) of the outer convex section 18b of the side plate 18, the damper unit, which is further radially inside than the limiter unit 2, can be located at a position closer to the side of flywheel 5 (left side in FIG. 1), so the device can be made compact, and space efficiency in the axial direction can be improved.

EXAMPLE 7

Figure 17:
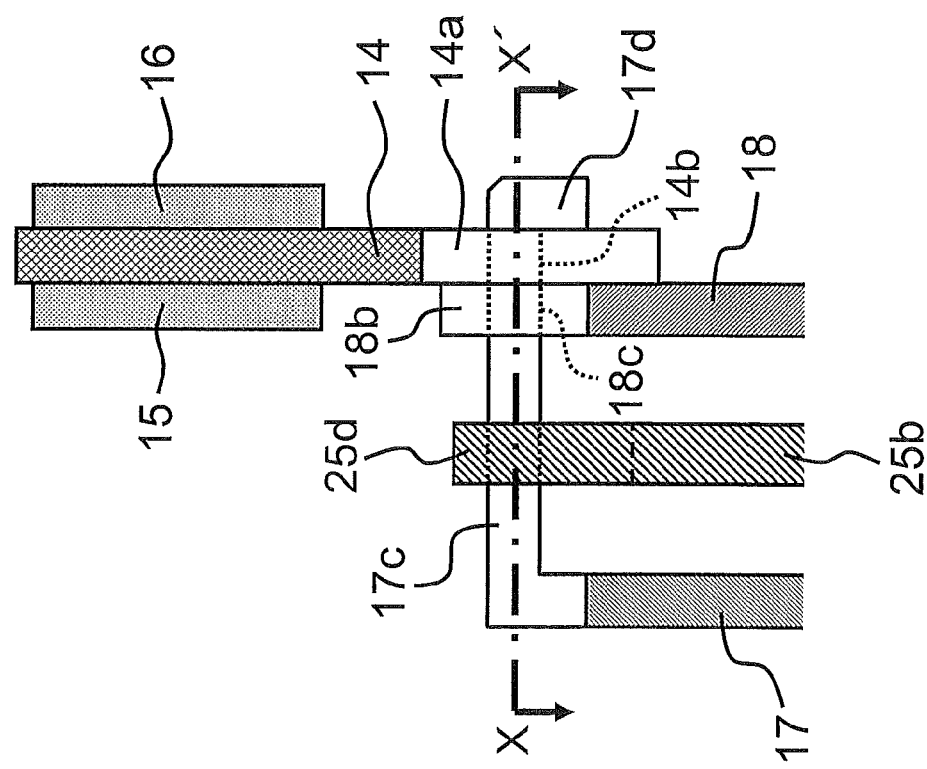
FIG. 17 is a partial enlarged cross-sectional drawing in the radial direction that schematically shows the stopper construction of a damper unit in a torque fluctuation absorber of the seventh Example.
Figure 18:
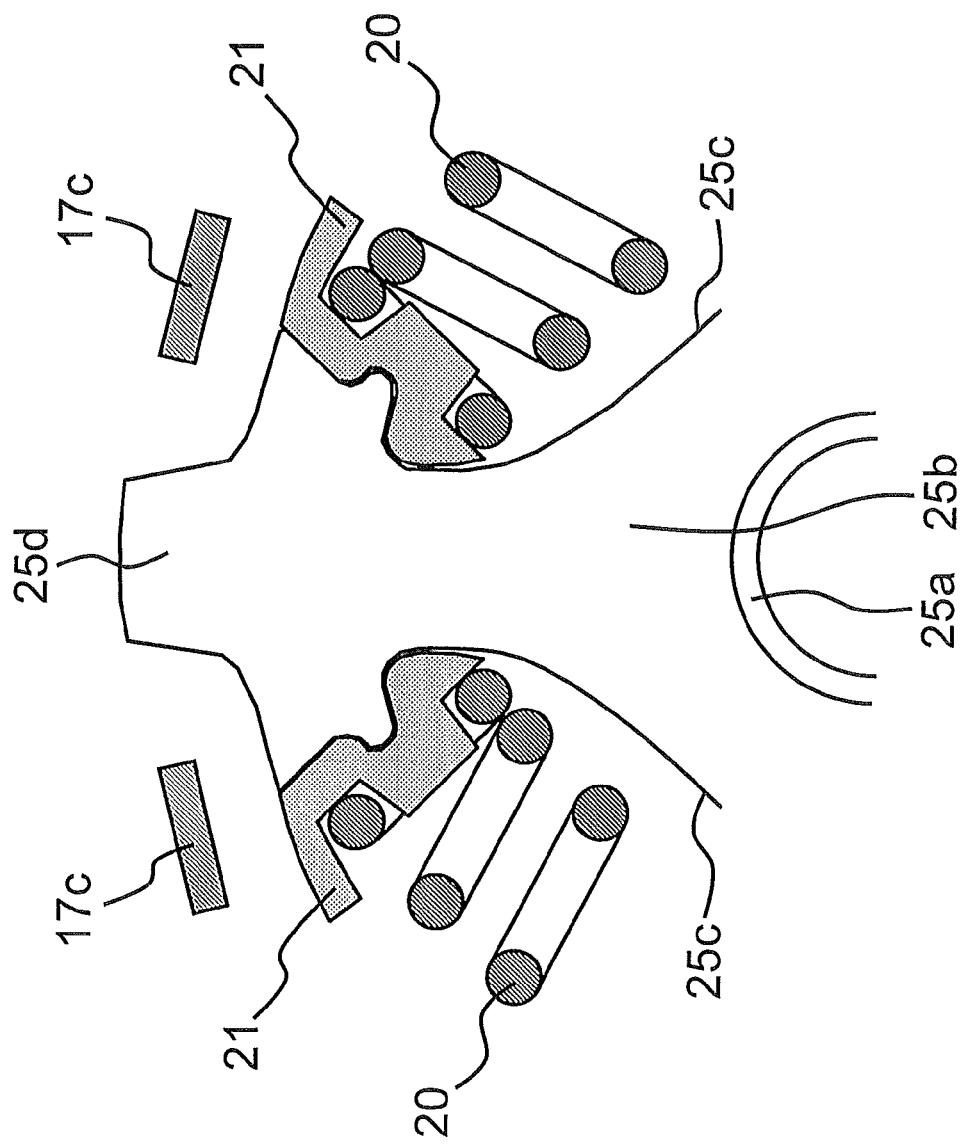
FIG. 18 is a partial enlarged top view that schematically shows the stopper construction of a damper unit in a torque fluctuation absorber of the seventh Example.
Figure 19:
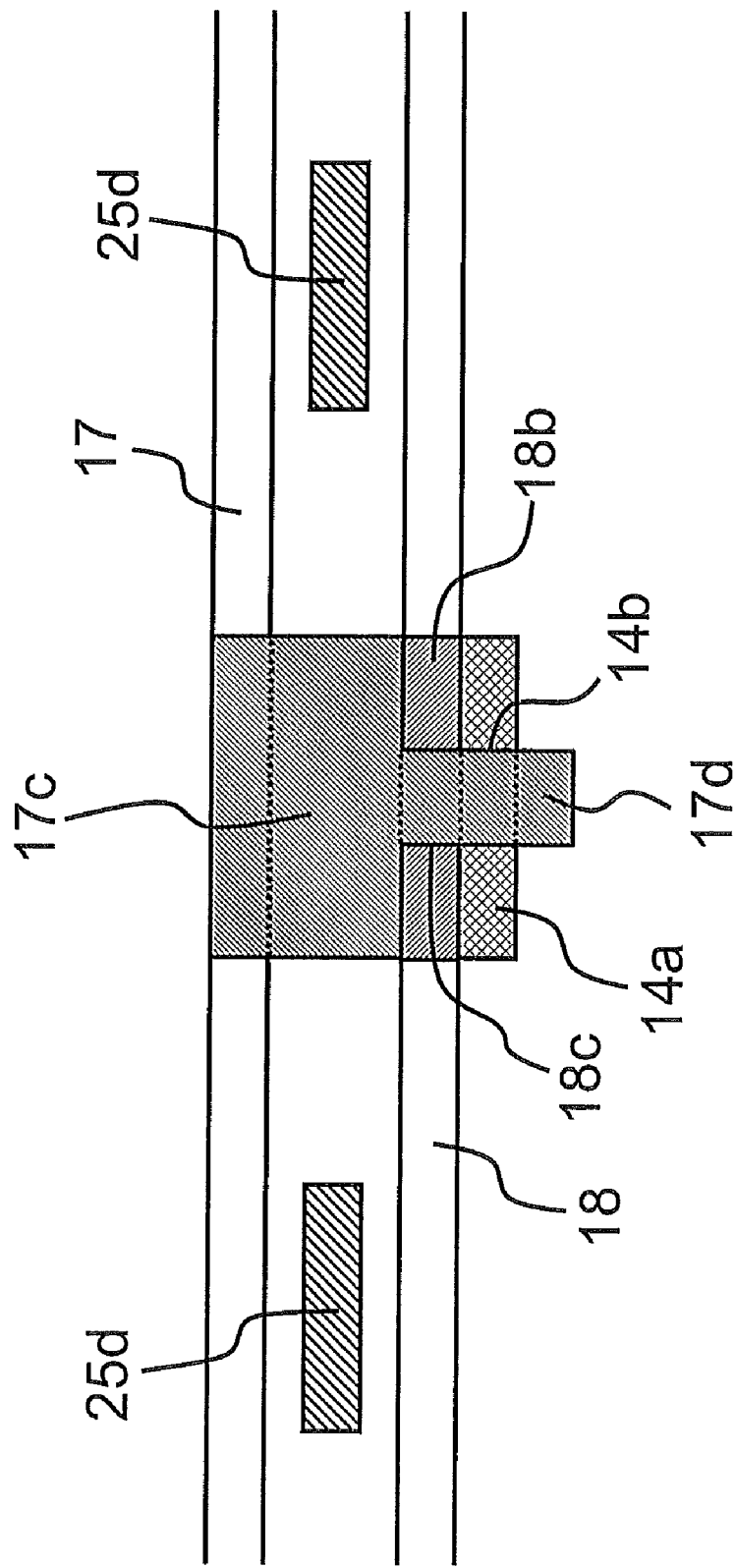
FIG. 19 is a partial cross-sectional drawing in the circumferential direction of section X-X' in FIG. 17 that schematically shows the stopper construction of a damper unit in a torque fluctuation absorber of the seventh Example.

A torque fluctuation absorber of a seventh Example is explained using the drawings. FIG. 17 is a partial enlarged cross-sectional drawing in the radial direction that schematically shows the stopper construction of a damper unit in a torque fluctuation absorber of this seventh Example. FIG. 18 is a partial enlarged view that schematically shows the stopper construction of a damper unit in a torque fluctuation absorber of this seventh Example. FIG. 19 is a partial cross-sectional drawing in the circumferential direction of the section X-X' in FIG. 17 that schematically shows the stopper construction of a damper unit in a torque fluctuation absorber of this seventh Example. FIG. 20 to FIG. 23 are partial enlarged cross-sectional drawings in the radial direction that schematically show first through fourth variations of the stopper construction of a damper unit in a torque fluctuation absorber of this seventh Example.

This seventh Example is a variation of the first Example (see FIG. 2), where instead of using rivets (correspond to 19 in FIG. 1) for fastening between the side plates 17, 18 and lining plate 14, a portion (stopper sections 17c and bent section 17d) of the side plate 17 is used for fastening between the side plates 17, 18 and lining plate 14 (see FIG. 17 and FIG. 19). The outer perimeter end section of the side plate 17 protrudes outward and has a stopper section 17c that is bent toward the side of the side plate 18. The stopper section 17c serves as a connecting portion between the lining plate 14 and the two side plates 17, 18. The portion that extends from the tip end section of a stopper section 17c is inserted into holes (cut out portions) 18c, 14b that are formed in the outer convex section 18b of the side plate 18 and the inner convex section 14a of the lining plate 14, and the bent portion on the tip end side of the inserted portion forms a bent section 17d. The length of a stopper section 17c, in the circumferential direction is greater than the length of the bent section 17d. The tip end section of a stopper section 17c, except for the extended portion (including the bent portion 17d), comes in contact with the outer convex section 18b of the side plate 8 and maintains spacing between the side plates 17, 18, i.e., serving as a spacer. The bent section 17d is bent such that the inner convex section 14a of the lining plate 14 is pressed on and is fastened to the outer convex section 18b of the side plate 18. When there is relative rotation between the side plates 17, 18 and the hub member (corresponds to 25 in FIG. 1), an outer convex sections 25d of the hub member (corresponds to 25 in FIG. 1) can move in the circumferential direction of the side plate 17 within a range (interval) between the neighboring stopper sections 17c of the side plate 17, and by contacting of the outer convex section 25d to a stopper section 17c, relative rotation between the side plates 17, 18 and the hub member (corresponds to 25 in FIG. 1) is prevented (see FIG. 18). The other construction is the same as that of the first Example. The side plate 18 could also have a stopper section. In that case, a portion that bends from the side plate 18 toward the side of the side plate 17 would function as a stopper section.

Figure 20:
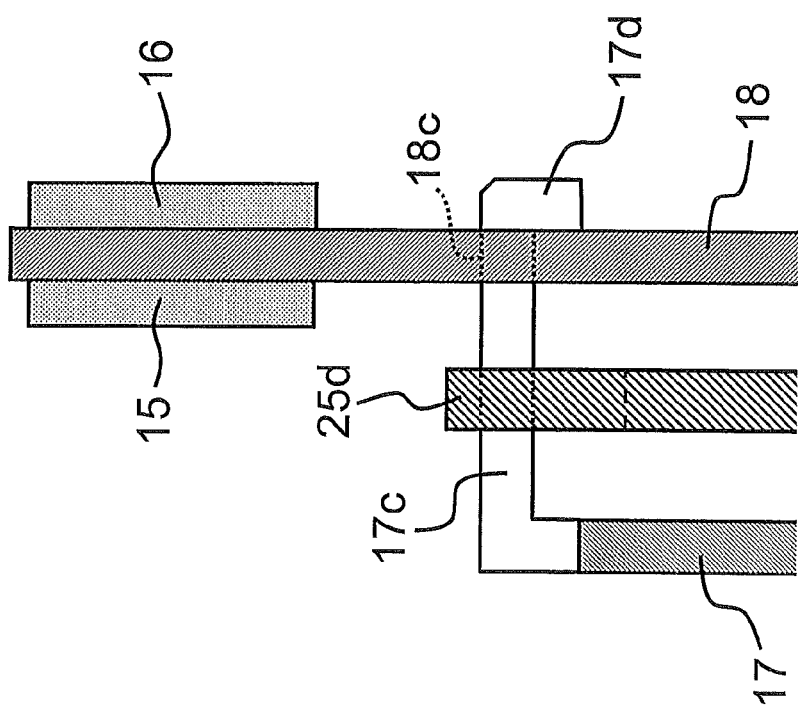
FIG. 20 is a partial enlarged cross-sectional drawing in the radial direction that schematically shows a first variation of stopper construction of a damper unit in a torque fluctuation absorber of the seventh Example.

As a variation of this seventh Example, as shown in FIG. 20 (variation 1), the following formulation may be employed. That is, a side plate 18 that is a combination of a side plate (18 in FIG. 17) and lining plate (14 in FIG. 17) is used, wherein bent section 17d formed on the tip end section of the stopper section 17c of the side plate 17 is inserted into hole 18c formed in the side plate 18, and bent to fasten the side plates 17, 18, and relative rotation between the hub member 25 and the side plates 17, 18 of the hub member (corresponds to 25 in FIG. 1) can be prevented by contact of the stopper section 17c to the outer convex section 25d. By doing so it is possible to reduce the number of parts.

Figure 21:
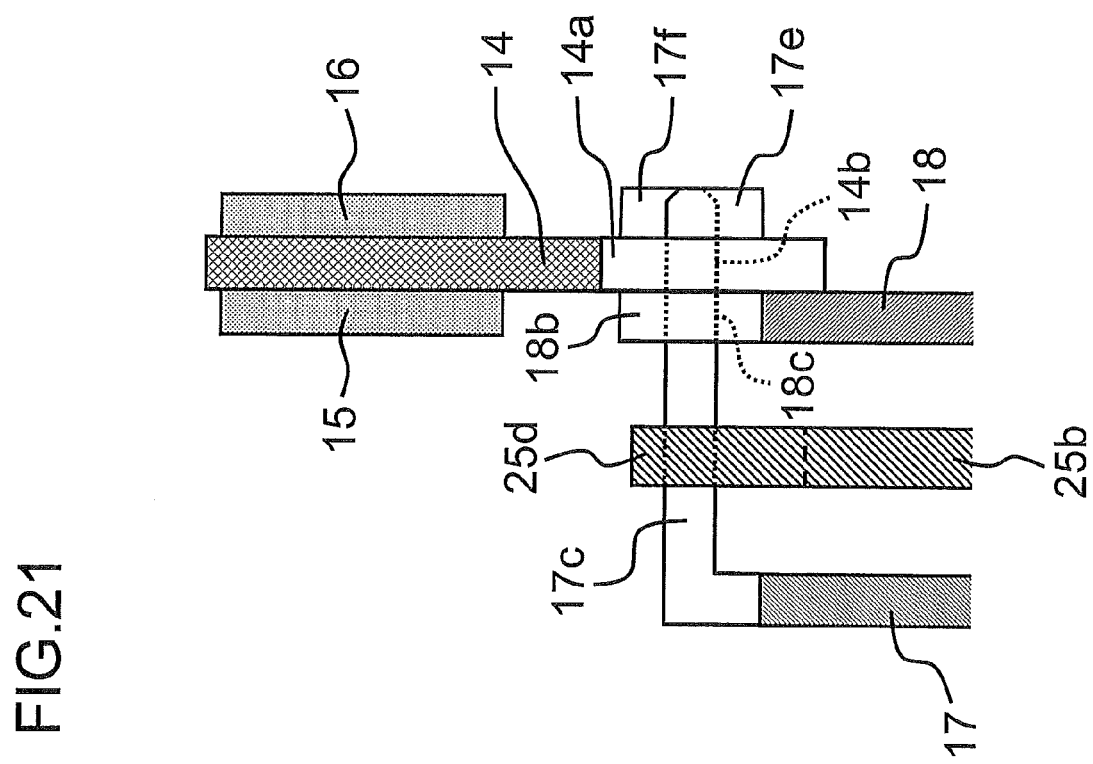
FIG. 21 is a partial enlarged cross-sectional drawing in the radial direction that schematically shows a second variation of stopper construction of a damper unit in a torque fluctuation absorber of the seventh Example.

Moreover, as shown in FIG. 21 (variation 2), two extensions that extend from the tip end sections of the stopper sections 17c of the side plate 17 are formed, and by inserting these two extensions into holes 18c, 14b that are formed in the outer convex section 18b of the side plate 18 and inner convex section 14a of the lining plate 14, and bending one of the extensions inward (to form a bent section 17e), and bending the other extension outward (to form a bent section 17f), the side plates 17, 18 and lining plate 14 can be fastened. By doing so, fastening between the side plates 17, 18 and the lining plate 14 is strengthened.

Figure 22:
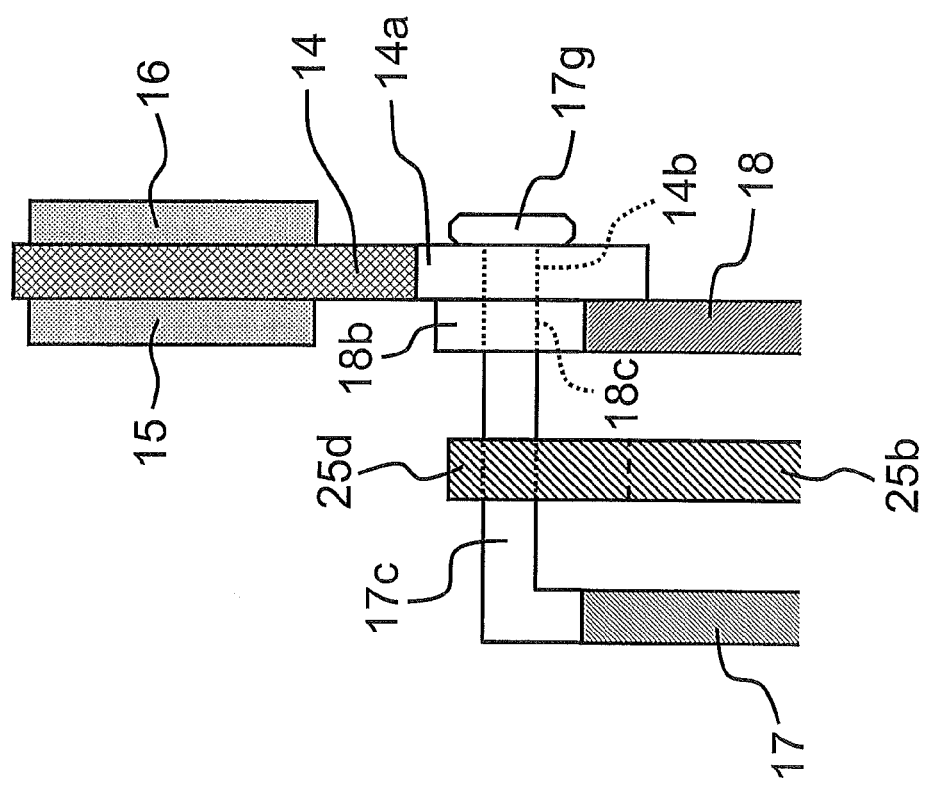
FIG. 22 is a partial enlarged cross-sectional drawing in the radial direction that schematically shows a third variation of stopper construction of a damper unit in a torque fluctuation absorber of the seventh Example.

Furthermore, as shown in FIG. 22 (variation 3), the portion that extends from the tip end of a stopper section 17c of the side plate 17 can be inserted into holes 18c, 14b that are formed in the outer convex section 18b of the side plate 18 and the inner convex section 14a of the lining plate 14 and crimped (to form a crimped section 17g) to fasten the side plates 17, 18 and lining plate 14. By doing so, fastening between the side plates 17, 18 and the lining plate 14 is strengthened.

Figure 23:
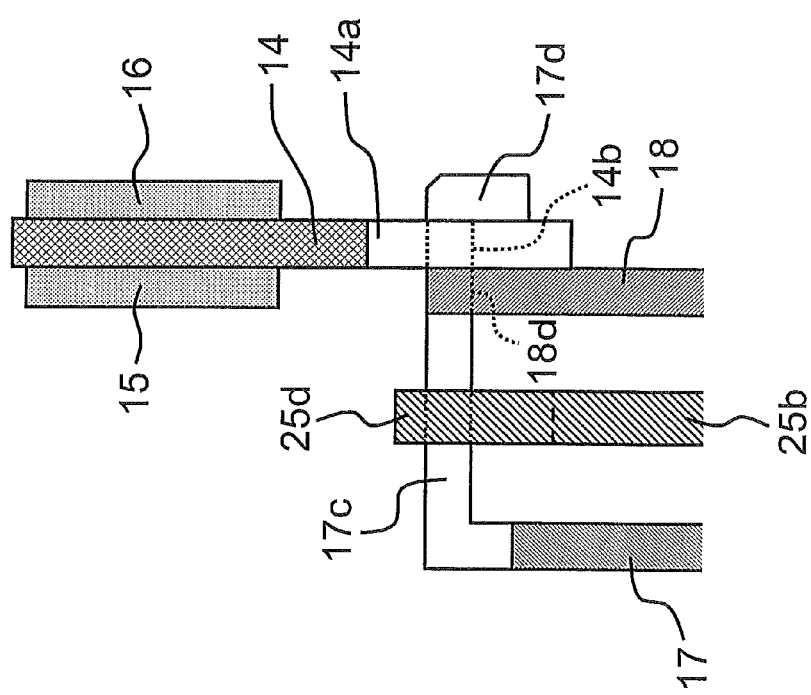
FIG. 23 is a partial enlarged cross-sectional drawing in the radial direction that schematically shows a fourth variation of stopper construction of a damper unit in a torque fluctuation absorber of the seventh Example.

Also, as shown in FIG. 23 (variation 4), the portion that extends from the tip end of a stopper section 17c of the side plate 17 can be inserted into holes 18c, 14b that are formed in the outer convex section 18b of the side plate 18 and the inner convex section 14a of the lining plate 14 and bent (to form a bent section 17d) to fasten the side plates 17, 18 and lining plate 14.

With this seventh Example, by using construction in which the lining plate 14 is located on the transmission side (right side in FIG. 1) of the outer convex section 18b of the side plate, the damper unit 3, which is located further radially inward than the limiter unit 2 can be placed at a position axially closer to the side of the flywheel 5 (left side in FIG. 1), so the device can be made compact and the space efficiency in the axial direction can be improved. Moreover, rivets (corresponding to 19 in FIG. 1) are not used for fastening the side plates 17, 18 and lining plate 14, so the number of parts can be reduced and the cost of the device can lowered.

The examples can be modified or adjusted within the framework of the total disclosure of this disclosure (including the claims) and based on the technical scope of the invention. Moreover, various combinations or selections of various disclosed elements are possible within the scope of the claims of the invention. That is, this disclosure, of course, includes various variations and modifications within the entire disclosure including the claims, and according to the technical scope are obvious to one skilled in the art.

Although the above description is made based on the exemplary Examples, this disclosure is not limited thereto.

It should be noted that modifications/adjustments may be done based on the basic technical concept of this disclosure. Also it should be noted that any combination of the disclosed and/or claimed elements, matters and/or items may fall under the modifications aforementioned.

Still further problems and object(s) as well as the developing mode(s) will become apparent from the entire disclosure, including the claims.

EXPLANATIONS OF SYMBOLS

1 Torque fluctuation absorber
2 Limiter unit
3 Damper unit
4 Hysteresis unit
5 Flywheel
6 Rotating shaft on the engine side (first rotating shaft)
7 Rotating shaft on the transmission side (second rotating shaft)
8 Bolt
9 Bolt
10 Cover plate
11 Support plate
12 Disk spring (annular)
13 Pressure plate
14 Lining plate (first plate member)
14a Inner convex section (stopper section)
14b Hole
15 Friction material
16 Friction material
17 Side plate (second plate member)
17a Window section
17b Outer convex section (stopper section)
17c Stopper section
17d Bent section
17e, 17f Bent section
17g Crimped section
18 Side plate (third plate member)
18a Window section
18b Outer convex section (stopper section)
18c Hole
18d Groove
19 Rivet
20 Coil spring (resilient member)
21 Seat member
22 Thrust member
23 Thrust member
24 Disk spring (annular)
25 Hub member
25a Hub section
25b Flange section (fourth plate member)
25c Window section
25d Outer convex section (protrusion)
25e Outer concave section (concave section)
27 Stopper member (stopper section)
27a, 27b Crimped section
29, 30, 31 Stopper member (stopper section)
29a, 29b Crimped section
33 Stopper member (stopper section)

What is claimed is:

1. A torque fluctuation absorber comprising:
a first plate member to which rotation power from a first rotating shaft is transmitted;
a substantially ring-shaped second plate member and third plate member to which rotation power from the first plate member is transmitted;
a fourth plate member located between the second plate member and the third plate member, wherein the fourth plate member transmits rotation power to a second rotating shaft;
a resilient member that absorbs torque fluctuation between the second or third plate members and the fourth plate member; wherein
the first plate member is located on the opposite side of the fourth plate member from the second plate member, wherein the first plate member rotates in unison with the second and third plate members;
a predetermined member on a power transmission path between at least two of the first, second and third plate members has a stopper section, wherein the stopper section allows relative rotation between the second or third plate member and the fourth plate member within a predetermined distance in the circumferential direction of the second plate member, and by contacting to the fourth plate member, prevents relative rotation between the second or third plate member and the fourth plate member;
the stopper section is a component of the first plate member; and the first plate member is formed such that a portion that corresponds to the stopper section is bent and located on an orbit of a predetermined portion of the fourth plate member.

2. The torque fluctuation absorber of claim 1, further comprising:
a flywheel located on a power transmission path between the first rotating shaft and the first plate member, wherein the flywheel is fastened to the first rotating shaft; wherein
the second plate member is located between the third plate member and the flywheel.

3. The torque fluctuation absorber of claim 1, further comprising:
a limiter unit located on a power transmission path between the first rotating shaft and the first plate member, wherein the limiter unit causes slipping to occur when the torque fluctuation reaches a predetermined value; wherein
the first plate member is a member on the output side of the limiter unit.

4. The torque fluctuation absorber of claim 1, wherein
the stopper section is a component of one of or both of the second and third plate members.

5. The torque fluctuation absorber of claim 4, wherein
one of or both of the second and third plate members have a portion that is processed by bending or drawing in a portion that corresponds to the stopper section.

6. The torque fluctuation absorber of claim 5, wherein
one of or both of the second and third plate members have an outward protruding outer convex section in the outer perimeter end section thereof in the portion that corresponds to the stopper section,
the first plate member is fastened to the outer convex section by rivets; and
the predetermined portion of the fourth plate member is an other outward protruding outer convex section in an outer perimeter section.

7. The torque fluctuation absorber of claim 1, wherein
the stopper section is a stopper member that is located between at least the second and third plate members.

8. The torque fluctuation absorber of claim 7, wherein
one end of the stopper member is crimped to fasten the second plate member, and the other end of the stopper member is crimped to fasten the third and first plate members.

9. The torque fluctuation absorber of claim 7, wherein
one end of the stopper member is crimped to fasten the second plate member, and the other end of the stopper member is crimped to fasten the third plate member.

10. The torque fluctuation absorber of claim 7, wherein
the stopper member is formed such that a length in a circumferential direction of the second plate member is longer than a length in a direction that orthogonally crosses an axial direction of the second rotating shaft.

11. The torque fluctuation absorber of claim 7, wherein
the resilient member is one of a plurality of resilient members, and the predetermined portion of the fourth plate member is an outward protruding outer convex section at an outer perimeter end section of a portion located between neighboring two of the resilient members.

12. The torque fluctuation absorber of claim 11, wherein
the stopper member is located further outside than the most outside portion of the resilient members in a direction perpendicular to the axis of the first rotating shaft.

13. The torque fluctuation absorber of claim 7, wherein
a resilient member is one of a plurality of the resilient members, and wherein the predetermined portion of the fourth plate member is a concave section or hole section that is formed in a portion located between neighboring two of the resilient members.

14. The torque fluctuation absorber of claim 13, wherein
the stopper member is located further inside than the most outside portion of the resilient member in the direction perpendicular to the axis of the first rotating shaft.

15. The torque fluctuation absorber of claim 7, wherein
the stopper member is fastened to the second and third plate member by a rivet.

16. The torque fluctuation absorber of claim 15, wherein
the stopper member is formed into a plate shape.

17. The torque fluctuation absorber of claim 1, wherein
the stopper section is a component of the second plate member or the third plate member; and
one plate member of the second and third plate members has the stopper section that extends toward the other plate member, with a portion that extends from a tip end of the stopper section being inserted into a hole or groove that is formed in the other plate member, and fastens the other plate member to the one plate member.

18. The torque fluctuation absorber of claim 17, wherein
fastening the other plate member to the one plate member is performed by forming the portion that extends from the tip end of the stopper section into a bent section that is bent into one or a plurality of directions.

19. The torque fluctuation absorber of claim 1, wherein
a portion of the first plate member different than the portion that corresponds to the stopper section is located at a position that is offset toward the side of the third plate member with respect to the stopper section, and fastened to the second and third plate members by a rivet.

* * * * *